(12) United States Patent
Hwang

(10) Patent No.: US 8,867,245 B1
(45) Date of Patent: Oct. 21, 2014

(54) SWITCHING POWER SUPPLY HAVING HIGH-POWER INTEGRATED CIRCUIT AND MONOLITHIC INTEGRATED CIRCUIT THEREFOR

(75) Inventor: Jeffrey Hwang, Saratoga, CA (US)

(73) Assignee: Champion Microelectronic Corporation, Hsinchu (TW)

( * ) Notice: Subject to any disclaimer, the term of this patent is extended or adjusted under 35 U.S.C. 154(b) by 849 days.

(21) Appl. No.: 12/891,772

(22) Filed: Sep. 27, 2010

(51) Int. Cl.
*H02M 7/757* (2006.01)
*H02M 5/45* (2006.01)
*H02M 3/335* (2006.01)

(52) U.S. Cl.
USPC .............................. 363/79; 37/21.04; 37/21.12

(58) Field of Classification Search
USPC .................. 323/282–285; 363/37, 78–82, 125
See application file for complete search history.

(56) References Cited

U.S. PATENT DOCUMENTS

| | | | |
|---|---|---|---|
| 4,811,075 A | 3/1989 | Eklund | |
| 5,959,439 A * | 9/1999 | Shenai et al. | 323/222 |
| 6,107,851 A | 8/2000 | Balakirshnan et al. | |
| 6,229,366 B1 | 5/2001 | Balakirshnan et al. | |
| 6,249,876 B1 | 6/2001 | Balakrishnan et al. | |
| 6,445,600 B2 * | 9/2002 | Ben-Yaakov | 363/39 |
| 6,531,854 B2 | 3/2003 | Hwang | |
| 6,608,471 B2 * | 8/2003 | Balakrishnan et al. | 323/283 |
| 6,657,417 B1 | 12/2003 | Hwang | |
| 6,700,764 B2 | 3/2004 | Tan | |
| 7,030,596 B1 * | 4/2006 | Salerno et al. | 323/282 |
| 7,042,200 B2 * | 5/2006 | Chen et al. | 323/283 |
| 7,145,316 B1 * | 12/2006 | Galinski, III | 323/288 |
| 7,660,133 B1 | 2/2010 | Hwang et al. | |
| 2004/0174152 A1 | 9/2004 | Hwang et al. | |
| 2005/0207189 A1 * | 9/2005 | Chen | 363/21.15 |
| 2006/0120120 A1 * | 6/2006 | Lin et al. | 363/65 |
| 2007/0145956 A1 * | 6/2007 | Takeuchi | 323/207 |
| 2009/0034298 A1 | 2/2009 | Liu et al. | |
| 2010/0079125 A1 * | 4/2010 | Melanson et al. | 323/285 |
| 2010/0226149 A1 * | 9/2010 | Masumoto | 363/20 |
| 2011/0050188 A1 * | 3/2011 | Wang et al. | 323/282 |
| 2011/0148681 A1 * | 6/2011 | Mao et al. | 341/153 |

* cited by examiner

*Primary Examiner* — Adolf Berhane
*Assistant Examiner* — Henry Lee, III
(74) *Attorney, Agent, or Firm* — Westberg Law Offices

(57) ABSTRACT

A switching power supply comprises one or more power supply stages that receive power from an input power source and that generate a regulated output voltage for powering a load. A controller monitors at least the regulated output voltage and generates at least one switch control signal for alternately opening and closing a switch so as to regulate the regulated output voltage. A monolithic integrated circuit is coupled to receive the switch control signal. The monolithic integrated circuit is separate from the controller and comprises a plurality of transistors capable of operation at voltage levels that are at least one order of magnitude higher than voltage levels within the controller integrated circuit.

31 Claims, 24 Drawing Sheets

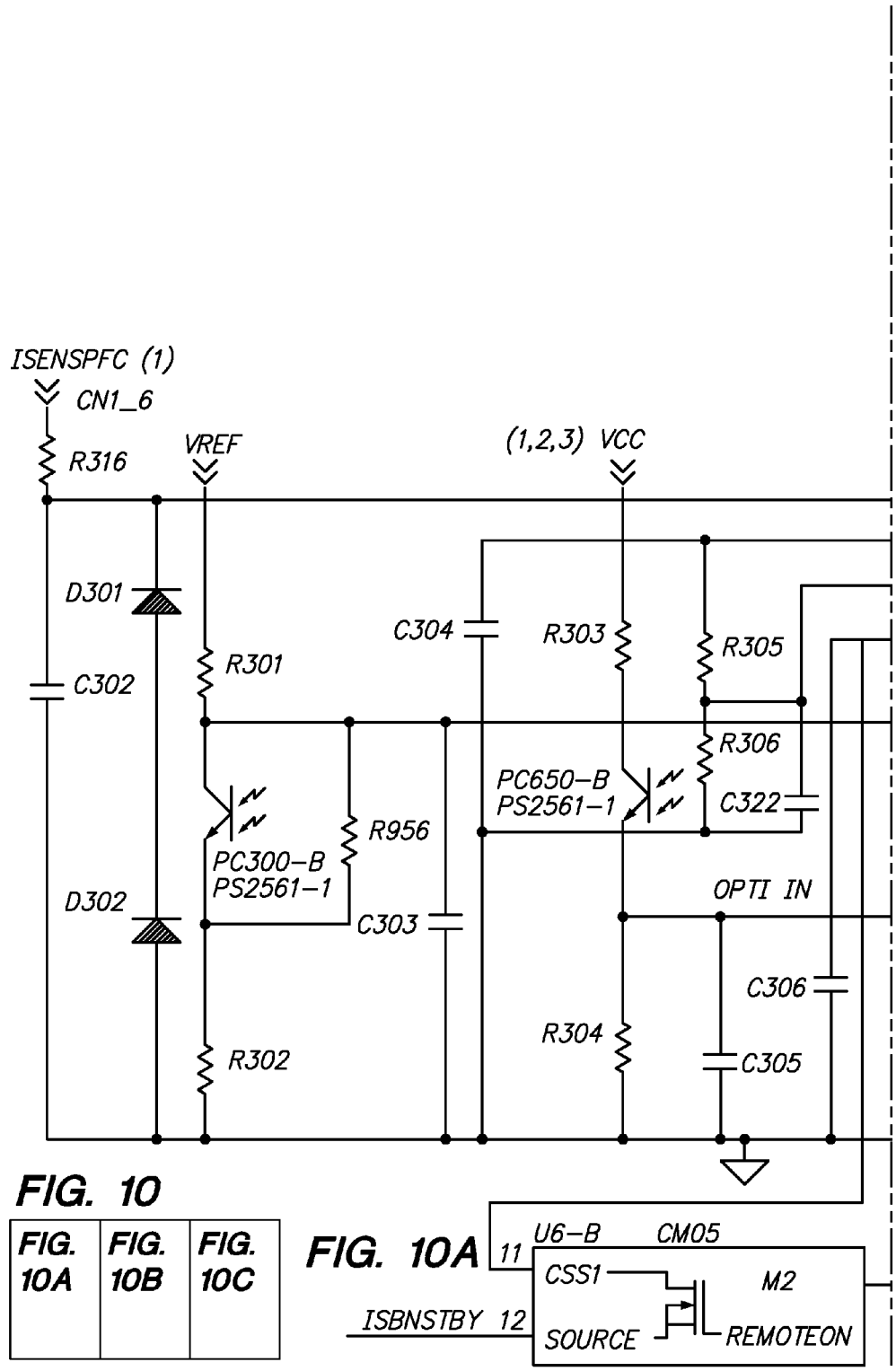

| FIG. 15A | FIG. 15B |

SWITCHING POWER SUPPLY HAVING HIGH-POWER INTEGRATED CIRCUIT AND MONOLITHIC INTEGRATED CIRCUIT THEREFOR

BACKGROUND OF THE INVENTION

The present invention relates to the field of off-line switching power supplies.

An off-line switching power supply receives power from an alternating-current (AC) power source and provides a voltage-regulated, direct-current (DC) output that can be used to power a load. An exemplary off-line power supply includes a power factor correction (PFC) stage and a DC-to-DC converter stage. The PFC stage receives the AC input signal, performs rectification and maintains current drawn from the AC source substantially in phase with the AC voltage so that the power supply appears as a resistive load to the AC source. The DC-to-DC converter stage receives the rectified output of the PFC stage and generates the voltage-regulated, DC output which can be used to power the load. The rectified output of the PFC stage is typically at higher voltage and is more loosely regulated than the output of the DC-to-DC stage.

An off-line power supply typically includes control circuitry, including analog and digital circuitry, that operates at relatively low voltage levels of approximately 5 to 15 volts DC. However, voltage levels within the power supply can reach levels of several hundred volts. For example, the rectified output of the PFC stage can be regulated to approximately 380 volts DC or higher.

Additionally, it is increasingly important for power supplies to operate efficiently so as to minimize power usage.

Therefore, what is needed are improved techniques for accommodating different voltage levels within a switching power supply while achieving efficient operation.

SUMMARY OF THE INVENTION

In accordance with an embodiment, a switching power supply comprises one or more power supply stages that receive power from an input power source and that generate a regulated output voltage for powering a load. A controller monitors at least the regulated output voltage and generates at least one switch control signal for alternately opening and closing a switch so as to regulate the regulated output voltage. A monolithic integrated circuit is coupled to receive the switch control signal. The monolithic integrated circuit is separate from the controller and comprises a plurality of transistors capable of operation at voltage levels that are at least one order of magnitude higher than voltage levels within the controller integrated circuit.

In accordance with another embodiment, a monolithic integrated circuit for a switching power supply comprises a first plurality of transistor switches for receiving an input voltage sensing signal and an output voltage sensing signal from a power factor correction stage of the switching power supply. The first plurality of transistor switches are configured to selectively disable the input voltage sensing signal and the output voltage sensing signal when the power factor correction stage is inactive. The monolithic integrated circuit also comprises at least one transistor coupled to receive at least one modulation control signal for regulating an output voltage of a DC-to-DC converter stage of the power supply.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
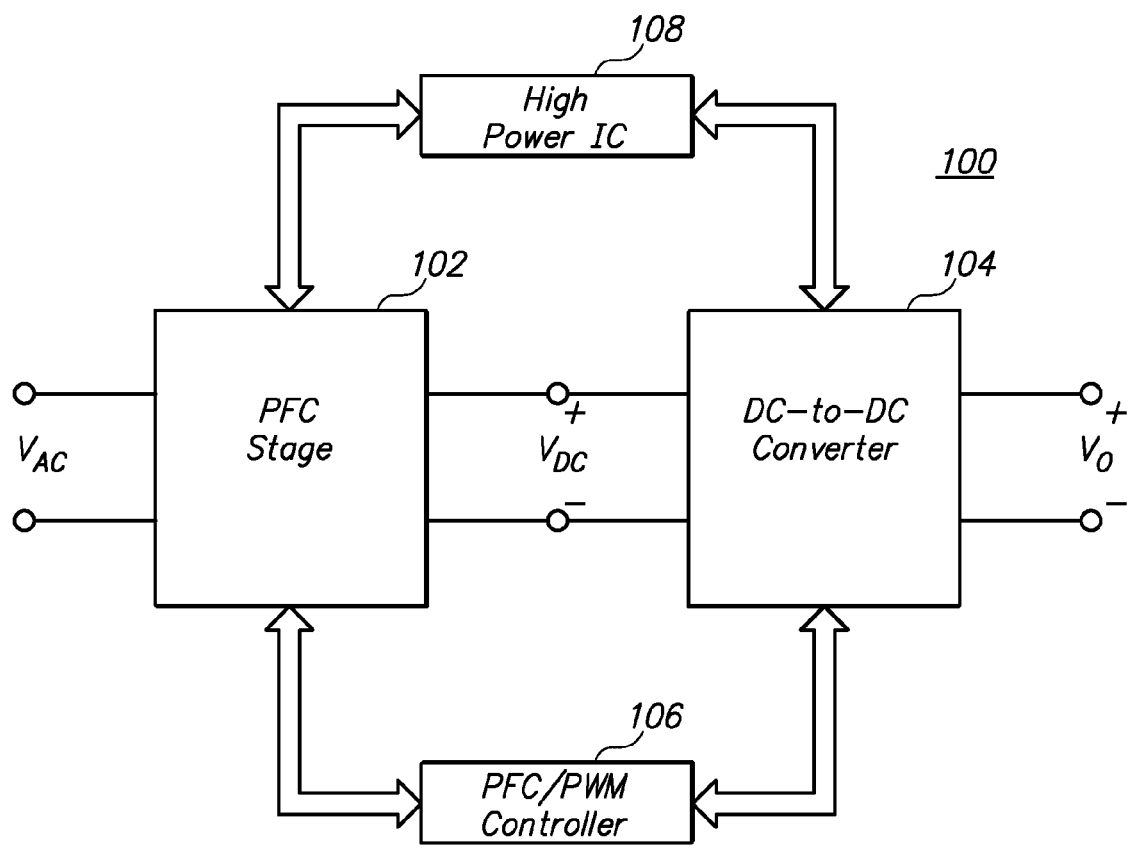
FIG. 1 illustrates a block schematic diagram of a power supply in accordance with an embodiment of the present invention.

FIG. 1 illustrates a block schematic diagram of a two-stage, off-line power supply 100 in accordance with an embodiment of the present invention. As shown in FIG. 1, a power factor correction (PFC) stage 102 has an input coupled to AC source. The PFC stage 102 performs rectification on the AC input signal and maintains current drawn from the AC source substantially in phase with the input voltage so that the power supply 100 appears as a resistive load to the AC source.

The PFC stage 102 generates an intermediate voltage, $V_{DC}$, which is provided as input to a DC-to-DC converter 104. Using the input $V_{DC}$, the DC-to-DC converter stage 104 generates a voltage-regulated, DC output, $V_O$, which can be used to power a load. The DC-to-DC converter may employ pulse width modulation (PWM) to form the voltage-regulated output $V_O$. The level of $V_{DC}$ is preferably at a higher voltage and is more loosely regulated than the output $V_O$ of the DC-to-DC converter stage 104. A nominal level for the output, $V_{DC}$, of the PFC stage 102 may be, for example, approximately 380 volts DC, while the voltage-regulated output $V_O$ of the DC-to-DC converter stage 104 may be, for example, approximately 12.0 volts DC.

A controller 106 is connected to the PFC stage 102 and to the DC-to-DC converter 104 to control operation of the power supply 100. More specifically, the controller 106 may monitor input current and voltage supplied to the PFC stage as well as the intermediate voltage, $V_{DC}$ to control operation of the PFC stage 102 so as to maintain the current drawn from the AC source substantially in phase with the AC voltage and to maintain the level of intermediate voltage $V_{DC}$. The controller 106 may also monitor the output voltage $V_O$ to control operation of the DC-to-DC converter 104 so as to maintain the level of the output voltage $V_O$. The controller 106 may perform other functions. In an embodiment, the controller 106 is implemented as an integrated circuit having low power circuit components that are capable of reliable operation in the range of 5 to 15 volts. Thus, control signals generated by the controller 106 and signals received by the controller 106 are preferably not higher than 15 volts DC.

An integrated circuit 108 may be connected to the PFC stage 102 and to the DC-to-DC converter 104. Operation of components of the integrated circuit 108 can be controlled by signals generated by the controller 106. The integrated circuit 108 includes high power components of the power supply, such as power transistors. For example, these components are manufactured using processes making them capable of reliable operation at voltages that exceed 400 volts DC, and possibly as high as 850 volts DC or more. These voltages are, therefore, at least an order of magnitude (i.e. at least 10×) higher than voltages within and generated by the controller 106. In an embodiment, the components of the integrated circuit 108 are manufactured as a single monolithic integrated circuit (i.e. having a single piece of semiconductor substrate). Such an integrated circuit is preferably a separate from that of the controller integrated circuit and packaged separately.

Figure 2:
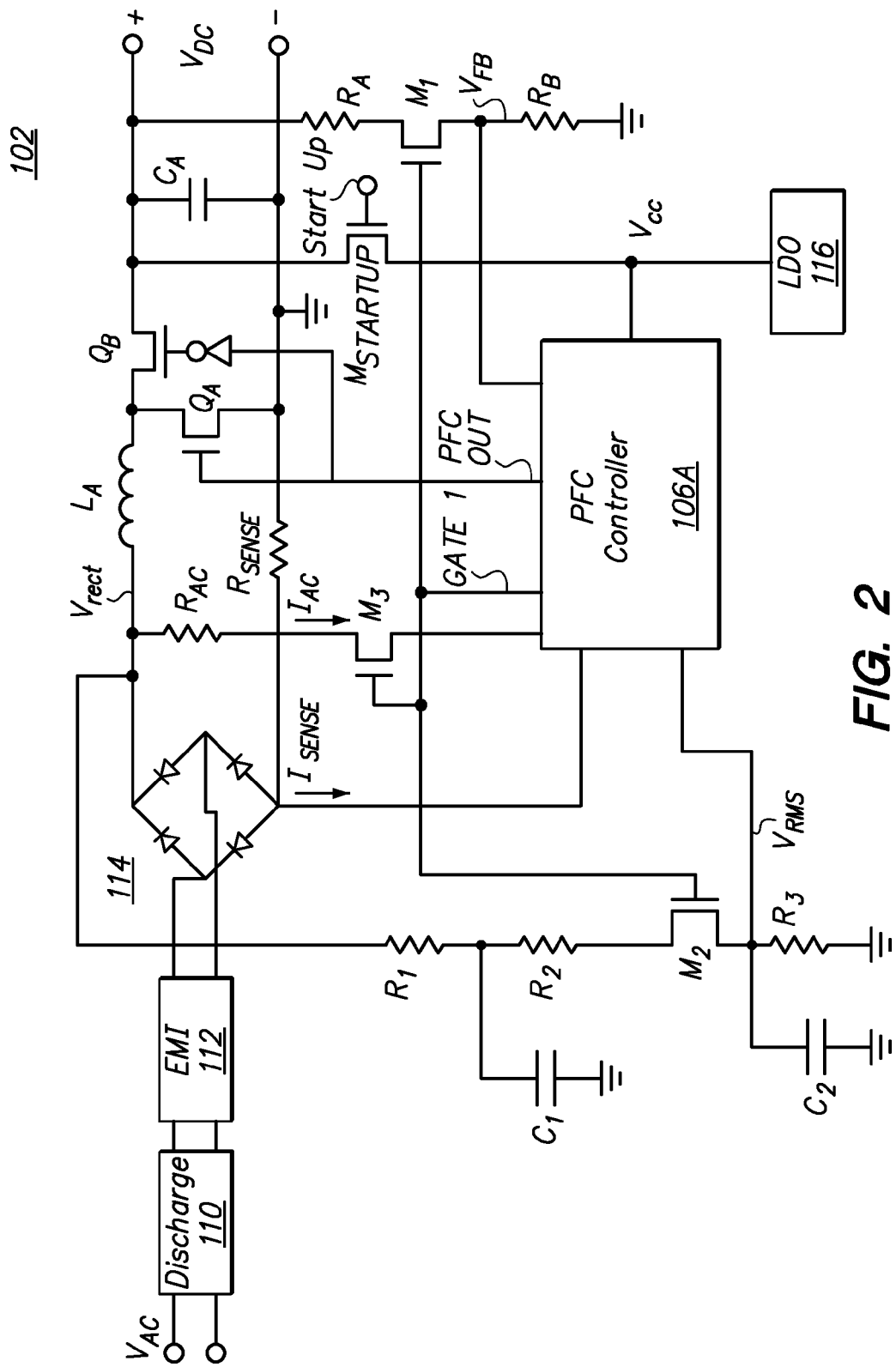
FIG. 2 illustrates a schematic diagram of a power factor correction circuit in accordance with an embodiment of the present invention.

FIG. 2 illustrates a schematic diagram of a power factor correction circuit 102 in accordance with an embodiment of the present invention. An alternating-current (AC) input source may be coupled to a discharge circuit 110, to an electro-magnetic interference (EMI) reducing circuit 112 and across input terminals of a bridge rectifier 114. When the PFC stage 102 is active, the discharge circuit 110 preferably does not interfere with operation of the PFC stage 102. However, when the PFC stage 102 is disconnected from the AC source, the discharge circuit preferably functions to discharge any capacitance seen at the input terminals to the PFC stage 102. This helps to ensure that the input terminals do not deliver a shock should a person contact the input terminals after the PFC stage 102 is disconnected from the AC source. Because the AC input voltage can be approximately 120 volts AC, the discharge circuit 110 is preferably manufactured using techniques that enable it to withstand this high voltage. In an embodiment, the discharge circuit 110 is included in the integrated circuit 108 (FIG. 1). The discharge circuit 110 is shown and described in more detail with reference to FIG. 4.

A rectified input voltage signal Vrect is formed at a first output terminal of the rectifier 114 and is coupled to a first terminal of an inductor $L_A$, to a first terminal of a resistor $R_{AC}$ and to a first terminal of a resistor $R_1$. A second terminal of the inductor $L_A$ is coupled to a first terminal of a transistor switch $Q_A$ and to a first terminal of a transistor switch $Q_B$. A second terminal of the switch $Q_B$ is coupled to a first terminal of an output capacitor $C_A$. A second terminal of the switch $Q_A$ and a second terminal of the capacitor $C_A$ are coupled to a ground node.

A second terminal of the resistor $R_{AC}$ is coupled to a voltage sensing input of a PFC switching controller 106A via a transistor switch $M_3$. A voltage sensing current signal $I_{AC}$ which is representative of the rectified input voltage Vrect flows through the resistor $R_{AC}$ and is received by the controller 106A via the transistor switch. $M_3$. A second output terminal of the bridge rectifier 114 is coupled to a first terminal of a resistor Rsense and to a current sensing input of the controller 106A. A second terminal of the resistor Rsense is coupled to a ground node. A signal Isense that is representative of the current input to the power factor correction circuit 102 is received by the controller 106A.

A output voltage sensing signal $V_{FB}$ is formed by a current flowing through a resistor $R_A$, a transistor switch $M_1$ and a resistor $R_B$. A first terminal of the resistor $R_A$ is coupled to the output voltage $V_{DC}$ and a second terminal of the resistor $R_A$ is coupled to a first terminal of the transistor switch $M_1$. A second terminal of the transistor switch $M_1$ is coupled to a first terminal of the resistor $R_B$. A second terminal of the resistor $R_B$ is coupled a ground node. The resistors $R_A$ and $R_B$ form a voltage divider in which the signal $V_{FB}$ is formed at the node between the resistors $R_A$ and $R_B$ when the switch. $M_1$ is closed. The signal $V_{FB}$ is representative of the output voltage $V_{DC}$.

A second terminal of the resistor $R_1$ is coupled to a first terminal of a resistor $R_2$ and to a first terminal of a capacitor $C_1$. A second terminal of the capacitor $C_1$ is coupled to the ground node. A second terminal of the resistor $R_2$ is coupled to a first terminal of a transistor switch $M_2$. A second terminal of the transistor switch $M_2$ is coupled to a first terminal of a capacitor $C_2$, to a first terminal of a resistor $R_3$ and to an RMS (root mean square) voltage sensing input to the controller 106A. A second terminal of the capacitor $C_2$ and a second terminal of a resistor $R_3$ are coupled to the ground node.

The PFC switching controller 106A may include portions of the controller 106 (FIG. 1) that control operation of the PFC stage 102. Thus, the controller 106A generates a signal $PFC_{OUT}$ which controls the opening and closing of the switches $Q_A$ and $Q_B$ so as to regulate the intermediate output voltage $V_{DC}$ while maintaining the input current in phase with the input voltage $V_{AC}$. To accomplish this, the controller 106A uses the signal $V_{FB}$, as well as the input current sensing signal Isense and the input voltage sensing signal $I_{AC}$. The controller 106A may also use the signal $V_{RMS}$ which is formed across the resistor $R_3$. The switches $Q_A$ and $Q_B$ are operated such that when one is opened, the other is closed.

The PFC stage 102 may be inactivated, for example, when a load is idle or in a standby mode. In this case, switching of the transistor switches $Q_A$ and $Q_B$ may be halted. When the PFC stage 102 is not active, the transistor switches $M_1$, $M_2$ and $M_3$ may all be opened so as to prevent power loss and resulting inefficiency caused by the current $I_{AC}$, a current passing through the output sensing resistors $R_A$ and $R_B$, as well as a current passing through the $V_{RMS}$ sensing resistor $R_3$. Opening the switches $M_1$, $M_2$ and $M_3$ disables these currents. The controller 106A may control the switches $M_1$, $M_2$ and $M_3$ via the signal GATE1. When the PFC stage 102 is active, the switches $M_1$, $M_2$ and $M_3$ may all be closed. As can be seen from FIG. 2, the transistor switches $M_1$, $M_2$ and $M_3$ are subjected to the AC input voltage or to the output voltage $V_{DC}$. The AC input voltage can be approximately 120 volts AC while the output voltage $V_{DC}$ may be approximately 380 volts DC or higher. As such, the switches $M_1$, $M_2$ and $M_3$ are preferably manufactured using techniques that enable them to withstand these high voltages. In an embodiment, the switches $M_1$, $M_2$ and $M_3$ are included in the integrated circuit 108 (FIG. 1).

The PFC controller 106A may receive a voltage signal $V_{CC}$ which is used to power the PFC controller 106A. The level of $V_{CC}$ is preferably 12 volts DC. The voltage $V_{CC}$ may also be used to power other portions of the controller 106 (FIG. 1). The voltage $V_{CC}$ is preferably regulated by a low drop out (LDO) regulator 116. The LDO 116 may be connected to receive power from an output of the DC-to-DC converter, from an auxiliary transformer winding (FIG. 8) or even from the rectified line voltage Vrect. The LDO 112 includes at least a transistor that is preferably manufactured using techniques that enable it to withstand high voltage levels. In an embodiment, the LDO 112 is included in the integrated circuit 108 (FIG. 1).

A transistor $M_{STARTUP}$ has a first terminal that is coupled to receive the output voltage $V_{DC}$. A second terminal of the transistor $M_{STARTUP}$ is coupled to a $V_{CC}$ node. On start-up of the power supply 100, the transistor $M_{STARTUP}$ allows current from the output voltage $V_{DC}$ to charge the $V_{CC}$ node, bringing its voltage level up more quickly. Because the voltage $V_{DC}$ may be approximately 380 volts DC or higher, the transistor $M_{STARTUP}$ is preferably manufactured using techniques that enable it to withstand this high voltage. In an embodiment, the transistor $M_{STARTUP}$ is included in the integrated circuit 108 (FIG. 1).

Figure 3A:
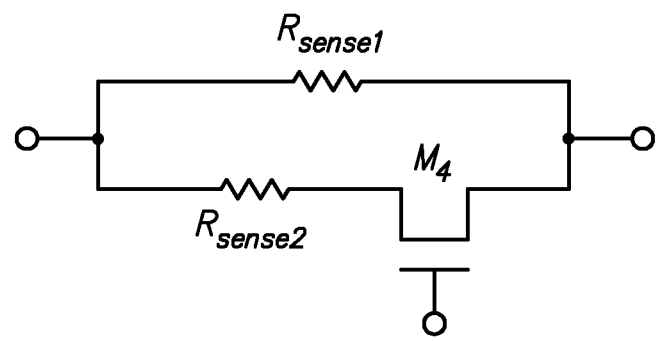
FIG. 3A-B illustrate alternative circuit arrangements for the power factor correction circuit of FIG. 2 in accordance with embodiments of the present invention.
Figure 3B:
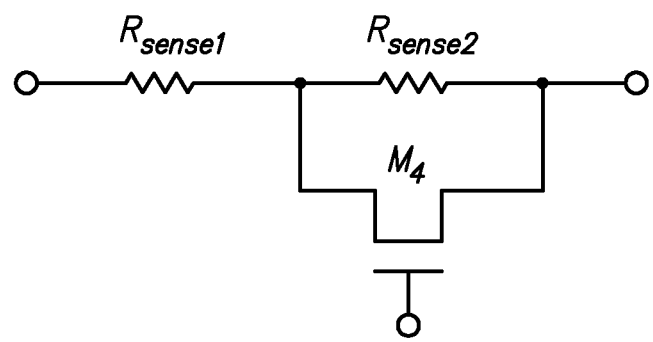

FIGS. 3A-B illustrate alternative circuit arrangements for the power factor correction circuit of FIG. 2 in accordance with embodiments of the present invention. The circuit arrangements of FIG. 3A or B can replace the sensing resistor Rsense (FIG. 2). As shown in FIG. 3A, the second output terminal of the bridge rectifier 114 (FIG. 2) is coupled to a first terminal of a resistor Rsense1, to a first terminal of a resistor Rsense2 and to a current sensing input of the controller 106A (FIG. 2). A second terminal of the resistor Rsense1 is coupled to the ground node. A second terminal of the resistor Rsense2 is coupled to a first terminal of a transistor switch $M_4$. A second terminal of the transistor switch $M_4$ is coupled to the ground node. Preferably, the transistor switch $M_4$ is closed when a load coupled to the power supply is drawing a heavy current. Under these conditions, the resistors Rsense1 and Rsense2 are in parallel so that the combined resistance is lower than Rsense1 alone. Thus, less power is consumed in the resistors Rsense1 and Rsense2. However, under light load conditions, the transistor switch $M_4$ is preferably opened. Therefore, the greater resistance of Rsense1 alone is presented. However, because the load is light, the current level and, thus power dissipation in the resistor Rsense1, can be expected to be low. Additionally, the greater resistance can be expected to improve accuracy of the current sensing signal Isense.

In an embodiment, the transistor $M_4$ is controlled based on the signal $V_{FB}$. More particularly, the transistor $M_4$ can be controlled based on a level of an error signal, which is, in turn derived from a difference between the signal $V_{FB}$ and a signal that is representative of a desired level for the output voltage $V_{DC}$. Thus, when the output voltage $V_{DC}$ is close to the desired level, this indicates a light load. However, when the output voltage $V_{DC}$ falls below its desired level, this indicates a heavy load.

As shown in FIG. 3B, the second output terminal of the bridge rectifier 114 (FIG. 2) is coupled to a first terminal of a resistor Rsense1 and to a current sensing input of the controller 106A (FIG. 2). A second terminal of the resistor Rsense1 is coupled to a first terminal of a resistor Rsense2 and to a first terminal of a transistor switch $M_4$. A second terminal of the resistor Rsense2 is coupled a second terminal of the transistor switch $M_4$ and to the ground node. Preferably, the transistor switch. $M_4$ is closed when a load coupled to the power supply is drawing a heavy current. Under these conditions, the resistor Rsense2 is effectively shorted so that the remaining resistance is that of Rsense1 alone. Thus, less power is consumed than if $M_4$ was open. However, under light load conditions, the transistor switch $M_4$ is preferably opened. Therefore, the greater combined resistance of Rsense1 and Rsense2 in series is presented. However, because the load is light, the current level and, thus power dissipation in the resistors Rsense1 and Rsense2, can be expected to be low. Additionally, as in FIG. 3A, the greater resistance can be expected to improve accuracy of the current sensing signal Isense.

As in FIG. 3A, the transistor $M_4$ of FIG. 3B, can be controlled based on the signal $V_{FB}$. More particularly, the transistor $M_4$ can be controlled based on a level of an error signal, which is, in turn derived from a difference between the signal $V_{FB}$ and a signal that is representative of a desired level for the output voltage $V_{DC}$.

Additional sensing resistors and control switches can be coupled in parallel or in series with the sensing resistor Rsense1. In this case, rather than providing two alternative resistance values for heavy and light loads, as in FIGS. 3A and B, three or more alternative resistance values may be provided, where the resistance values are selected depending upon the loading conditions (e.g. based on the level of $V_{FB}$). For example, three resistance values can be provided for each of heavy, medium and light loads.

The transistor $M_4$ is preferably manufactured using techniques that enable it to withstand high voltage levels. In an embodiment, the transistor $M_4$ is included in the integrated circuit 108 (FIG. 1).

Figure 4:
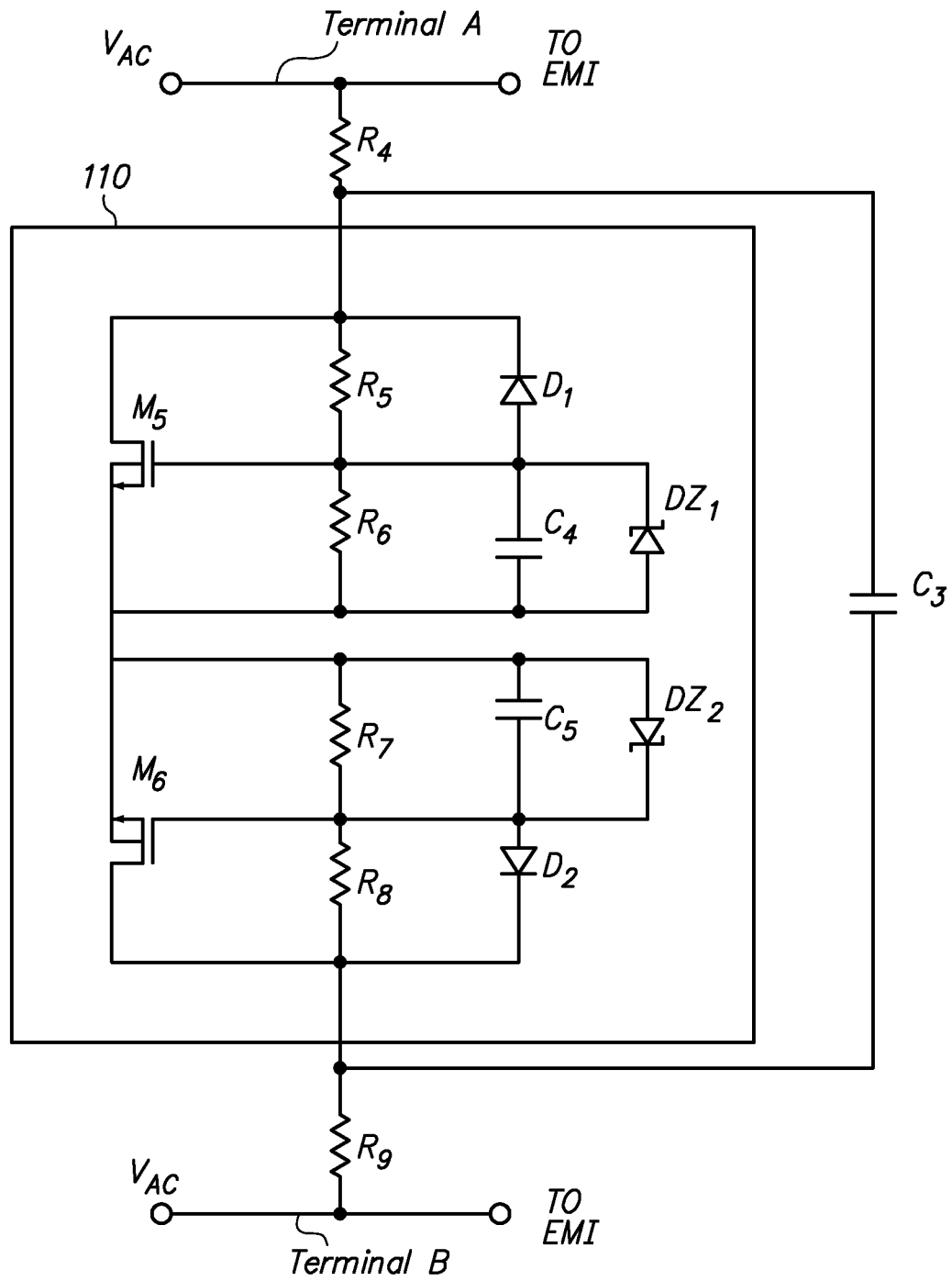
FIG. 4 illustrates a schematic diagram of a discharge circuit in accordance with an embodiment of the present invention.

FIG. 4 illustrates a schematic diagram of a discharge circuit in accordance with an embodiment of the present invention. A Terminal A is coupled to a first terminal of a resistor $R_4$. A second terminal of the resistor $R_4$ is coupled to a first terminal of a capacitor $C_3$, to a first terminal of a transistor $M_5$, to a first terminal of a resistor $R_5$ and to a cathode of a diode $D_1$. A second terminal of the resistor $R_5$ is coupled to a control terminal of the transistor $M_5$, to an anode of the diode $D_1$, to a first terminal of a resistor $R_6$, to a first terminal of a capacitor $C_4$ and to a cathode of a Zener diode $DZ_1$. A second terminal of the transistor $M_5$ is coupled to a second terminal of the resistor $R_6$, to a second terminal of the capacitor $C_4$, to an anode of the Zener diode $DZ_1$, to a first terminal of a transistor $M_6$, to a first terminal of a resistor $R_7$, to a first terminal of a capacitor $C_5$ and to an anode of a Zener diode $DZ_2$. A second terminal of the resistor $R_7$ is coupled to a control terminal of the transistor $M_6$, to a first terminal of a resistor $R_8$, to a second terminal of the capacitor $C_5$, to a cathode of the Zener diode $DZ_2$ and to an anode of a diode $D_2$. A second terminal of the transistor $M_6$ is coupled to a second terminal of the resistor $R_8$, to a cathode of the diode $D_2$, to a second terminal of the capacitor $C_3$ and to a first terminal of a resistor $R_9$. A second terminal of the resistor $R_9$ is coupled to a Terminal B.

When $V_{AC}$ is applied across Terminal A and Terminal B, the full voltage $V_{AC}$ is passed to the power supply (e.g. via the EMI circuit 112). Under these conditions, the transistors $M_5$ and $M_6$ are turned off and on in an alternating fashion in response to the changing polarity of the applied AC sine wave signal. However, the transistors $M_5$ and $M_6$ are not both turned on at the same time. When the voltage $V_{AC}$ is removed, as would occur if the power supply was to be unplugged, then the transistors $M_5$ and $M_6$ are biased on, so as to discharge any capacitance seen at the input terminals to the PFC stage 102. Thus, the PFC stage 102 is active, the discharge circuit 110 preferably does not interfere with operation of the PFC stage 102. However, when the PFC stage 102 is disconnected from the AC source, the discharge circuit 110 helps to ensure that the input terminals do not deliver a shock should a person contact the input terminals after the PFC stage 102 is disconnected from the AC source. Because the AC input voltage can be approximately 120 volts AC, the discharge circuit 110 is preferably manufactured using techniques that enable it to withstand this high voltage. In an embodiment, the discharge circuit 110 (or at least the discharge transistors $M_5$ and $M_6$) is included in the integrated circuit 108 (FIG. 1).

The transistors disclosed throughout this document can each be a MOSFET (metal oxide field effect transistor). However, any or all of the transistors can be replaced with another type of transistor, such as a bipolar junction transistor, with appropriate modifications. For example, the transistors $M_5$ and $M_6$ of FIG. 4 can be replaced with bipolar transistors. In this case, a diode is preferably added across the collector and emitter terminals of each such bipolar transistor.

Figure 5:
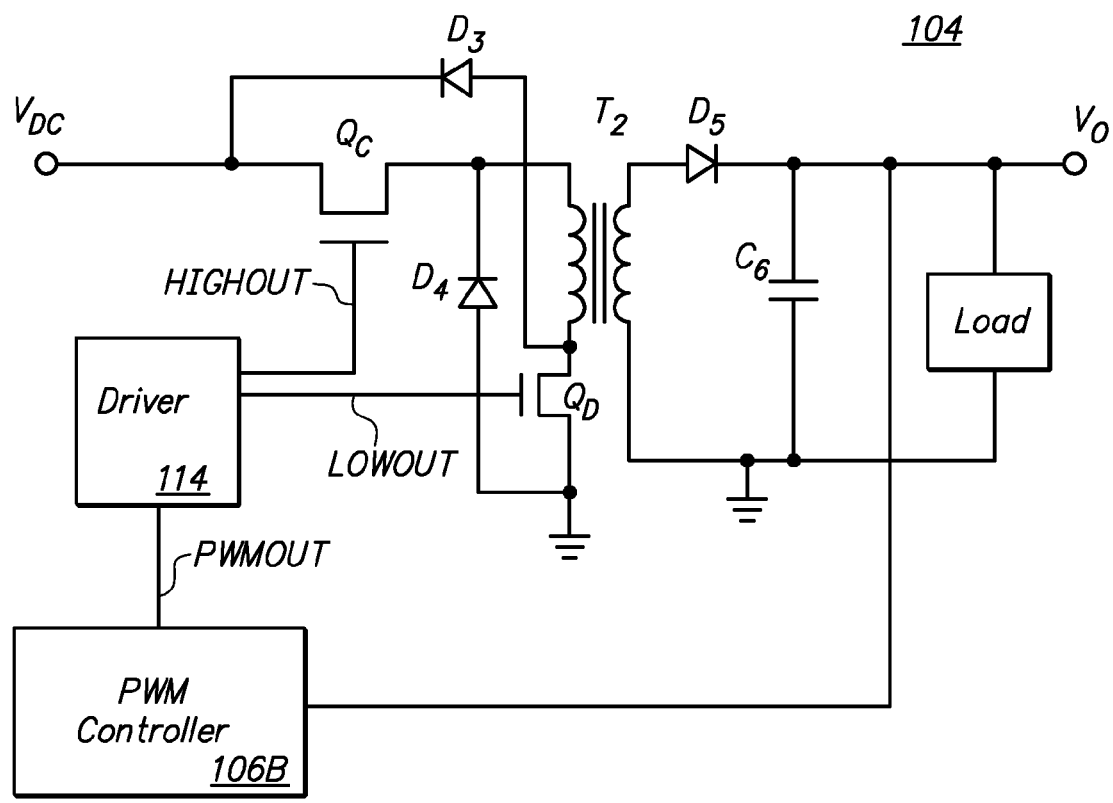
FIG. 5 illustrates a schematic diagram of a DC-to-DC converter in accordance with an embodiment of the present invention.

FIG. 5 illustrates a schematic diagram of a DC-to-DC converter 104 in accordance with an embodiment of the present invention. Referring to FIG. 5, a power source, such as the output $V_{DC}$ generated by the PFC stage 102 (FIGS. 1 and 2), is coupled to a first terminal of a transistor switch $Q_C$ and to a cathode of a diode $D_3$. A second terminal of the transistor switch $Q_C$ is coupled to a cathode of a diode $D_4$ and to a first terminal of a primary winding of a transformer $T_1$. A second terminal of the primary winding of the transformer $T_1$ is coupled to a first terminal of a transistor switch $Q_D$ and to an anode of the diode $D_3$. A second terminal of a transistor switch $Q_D$ is coupled to an anode of the diode $D_4$ and to a ground node.

A first terminal of a secondary winding of the transformer $T_1$ is coupled to an anode of a diode $D_5$. A cathode of the diode $D_5$ is coupled to a first terminal of a capacitor $C_6$ and to output voltage node. A second terminal of the secondary winding of the transformer $T_1$ is coupled to a second terminal of the capacitor $C_6$ and to a ground node. The output voltage $V_O$ may be formed at the output voltage node. A load may be coupled to receive the output voltage $V_O$.

The PWM controller 106B is coupled to the output voltage node. The PWM controller 106B monitors the output voltage $V_O$ and controls operation of the transistor switches $Q_C$ and $Q_D$ so as to maintain a constant level of the output voltage $V_O$. The PWM controller 106B generates a PWMOUT signal which is coupled to a driver 114 (also referred to as a high side driver). The driver 114 generates output signals that are coupled to control terminals of the switches $Q_C$ and $Q_D$. The switches $Q_C$ and $Q_D$ receive high voltage and current levels. For example, the switch $Q_C$ is coupled to the voltage $V_{DC}$ which may be approximately 380 volts DC or higher. As such, the driver 114 is preferably manufactured using techniques that enable it to withstand these high voltage and current levels. In an embodiment, the driver 114 is included in the integrated circuit 108 (FIG. 1). In an alternative embodiment, the switches $Q_C$ and $Q_D$ are also included in the integrated circuit 108 (FIG. 1).

The DC-to-DC converter 104 of FIG. 5 is arranged as a forward converter type of topology. However, other converter types can be employed, such as a flyback converter or other type of converter.

Figure 6:
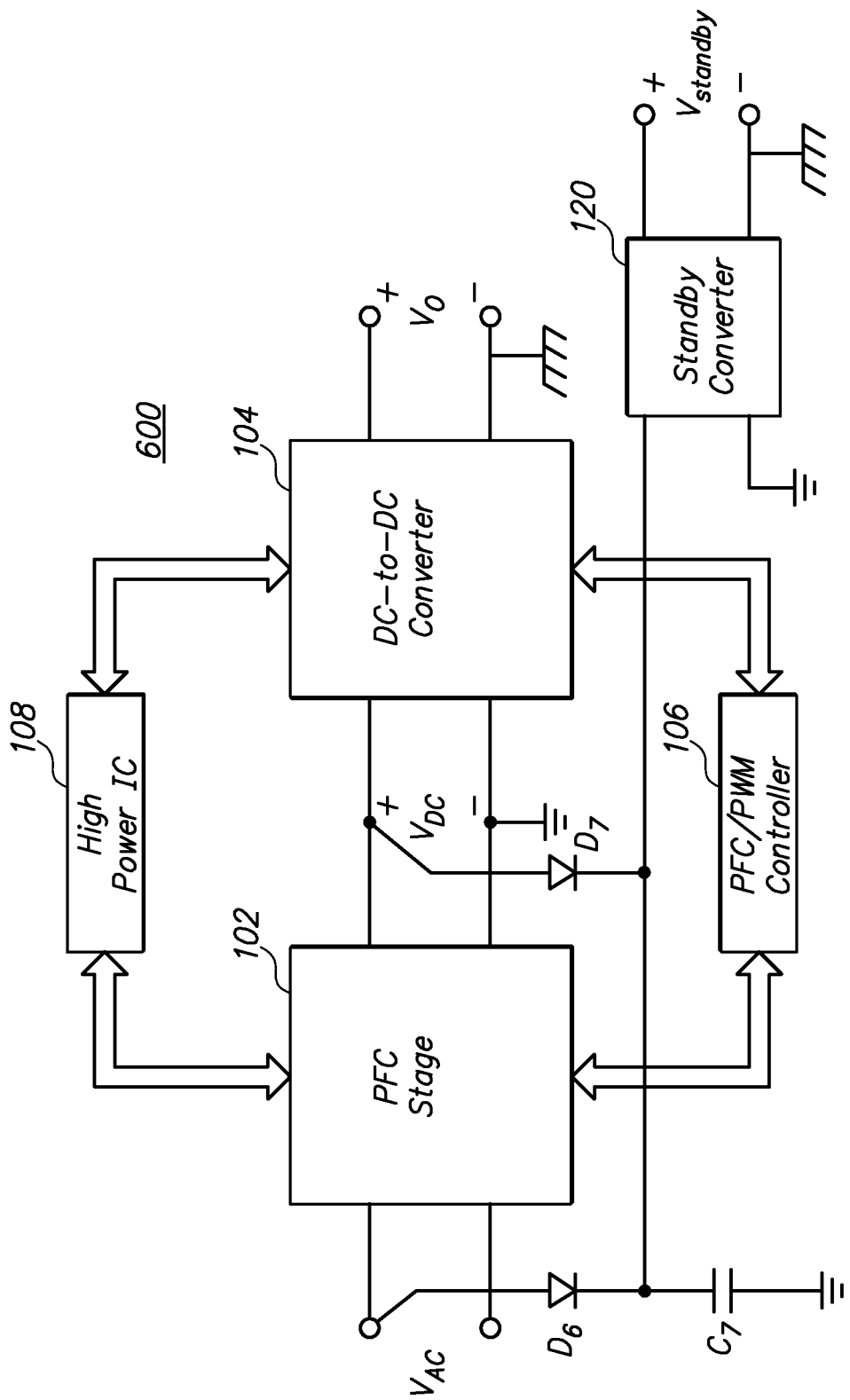
FIG. 6 illustrates a block schematic diagram of a power supply including a standby power converter in accordance with an embodiment of the present invention.

FIG. 6 illustrates a block schematic diagram of a power supply 118 in accordance with an embodiment of the present invention. The power supply 118 of FIG. 6 differs from the power supply 100 of FIG. 1 in that the power supply 118 includes a standby power converter 120. The PFC stage 102 and the main DC-to-DC converter 104 may be inactivated, for example, when a load is idle or in a standby mode. In this case, the load may be largely inactive, though certain features may remain active. Power for the features that remain active may be provided by the standby converter 120.

As shown in FIG. 6, an anode of a diode $D_6$ is coupled to the $V_{AC}$ input terminal of the PFC stage 102 while an anode of a diode $D_7$ is coupled to the $V_{DC}$ output terminal of the PFC stage 102. A cathode of the diode $D_6$ and a cathode of the diode $D_7$ are coupled to a first terminal of a capacitor $C_7$ and to an input terminal of the standby converter 120. A second terminal of the capacitor $C_7$ is coupled to a ground node. Thus, the standby converter 120 can draw its power from either the AC source or from the output of the PFC stage 102. Alternatively, the standby converter 120 can be connected to only one of the AC source or the output of the PFC stage 102. When the PFC stage is inactive, the output of the PFC stage can still be used to provide power to the standby converter 120, though the output of the PFC stage 102 can be expected to be at a lower level than when the PFC stage 102 is active.

The standby converter 120 forms a regulated output voltage $V_{STANDBY}$. The standby power converter 120 is shown and described in more detail with reference to FIG. 8.

Figure 7:
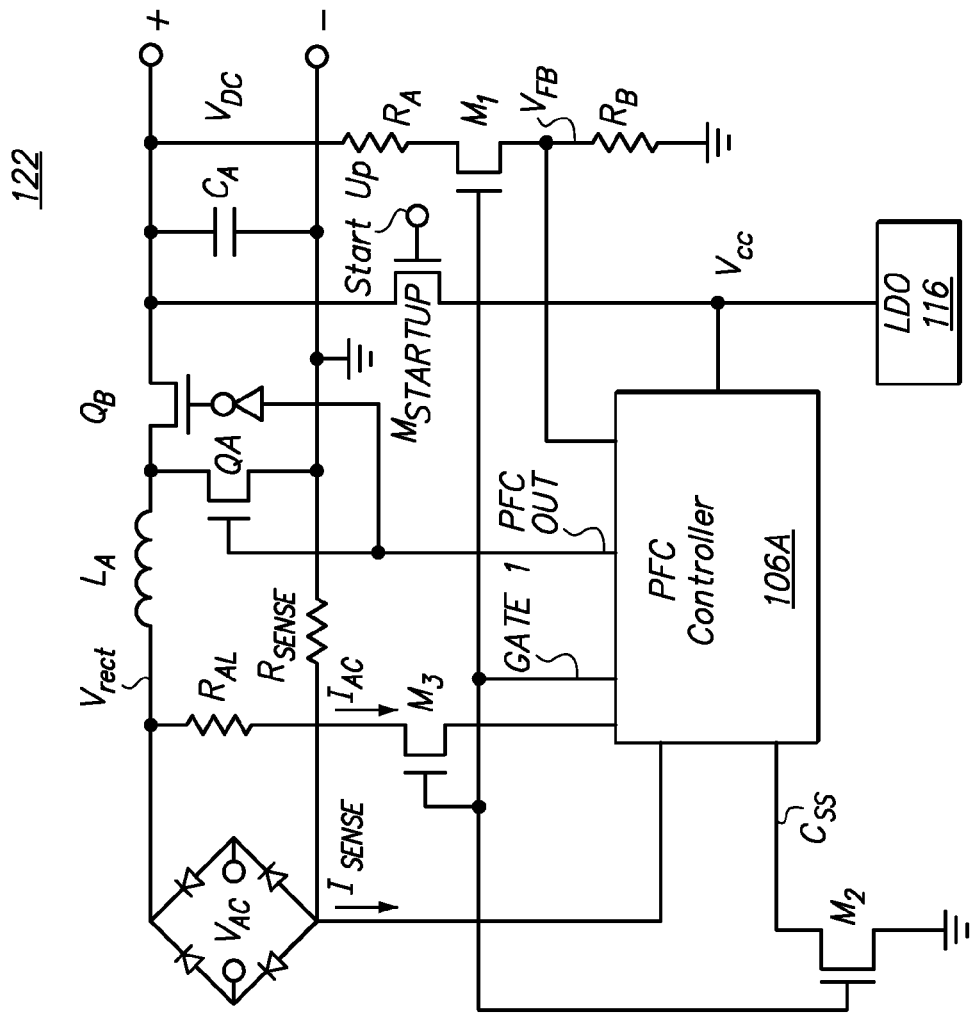
FIG. 7 illustrates a schematic diagram of a power factor correction circuit in accordance with an embodiment of the present invention.

FIG. 7 illustrates a schematic diagram of a power factor correction circuit 122 in accordance with an embodiment of the present invention. The PFC circuit 122 of FIG. 7 can be used in place of the PFC circuit 102 of FIG. 2. The PFC circuit 122 of FIG. 7 differs from the PFC circuit 102 of FIG. 2 in that the transistor $M_2$ is connected differently. More specifically, the resistors $R_1$, $R_2$, $R_3$ and the capacitors $C_1$ and $C_2$ of FIG. 2 are omitted. Additionally, the first terminal of the transistor $M_2$ is coupled to Css terminal of the PFC controller 106A. A second terminal of the transistor $M_2$ is coupled to a ground node. The control terminal of the transistor $M_2$ is coupled to receive the control signal GATE1 from the controller 106A. The transistor $M_2$ can be used for a remote on/off function.

Figure 9:
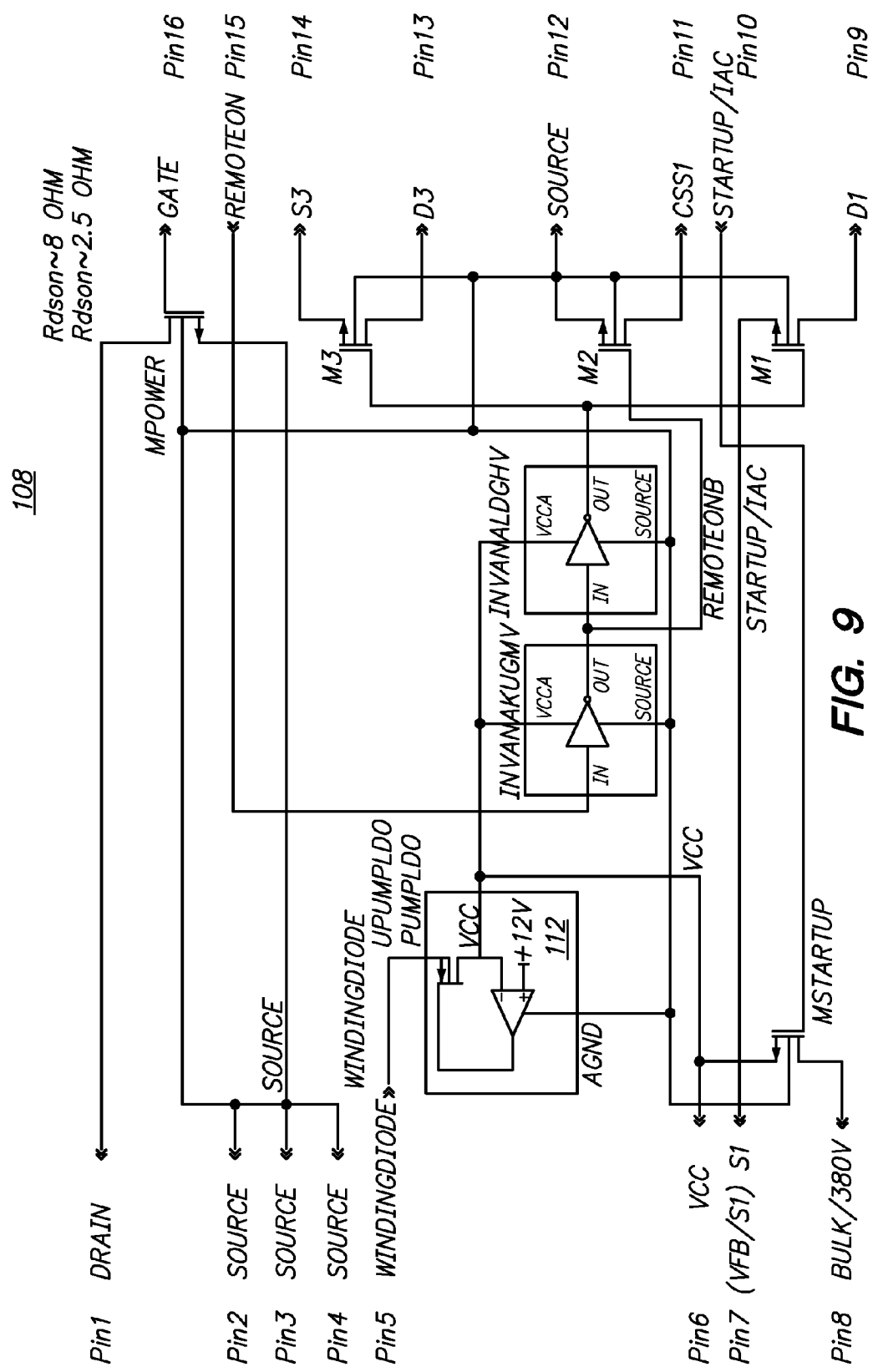
FIG. 9 illustrates a schematic diagram of a high power integrated circuit in accordance with an embodiment of the present invention.
Figure 10B:
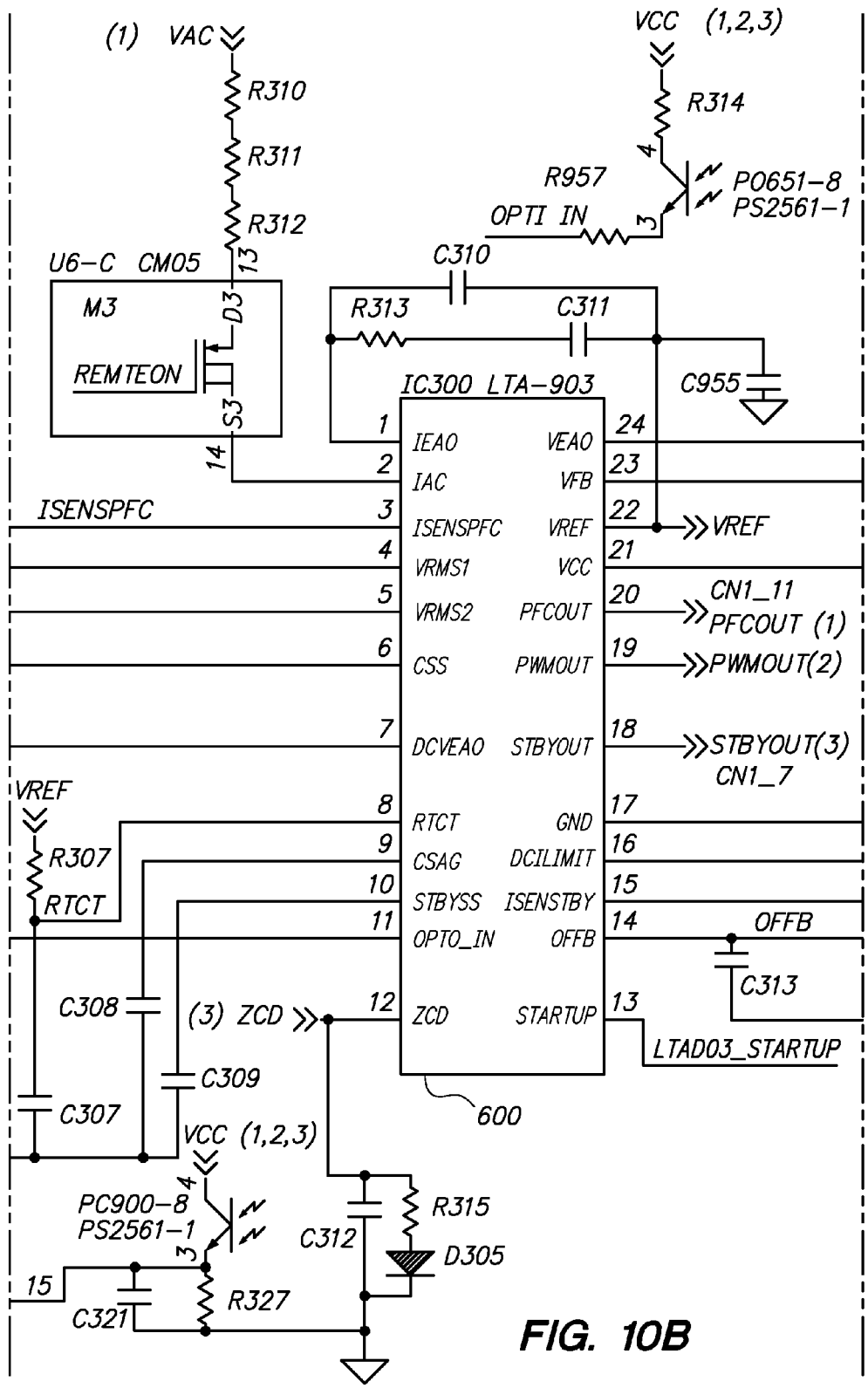
FIG. 10 illustrates a schematic diagram of a power supply in accordance with an embodiment of the present invention.
Figure 10C:
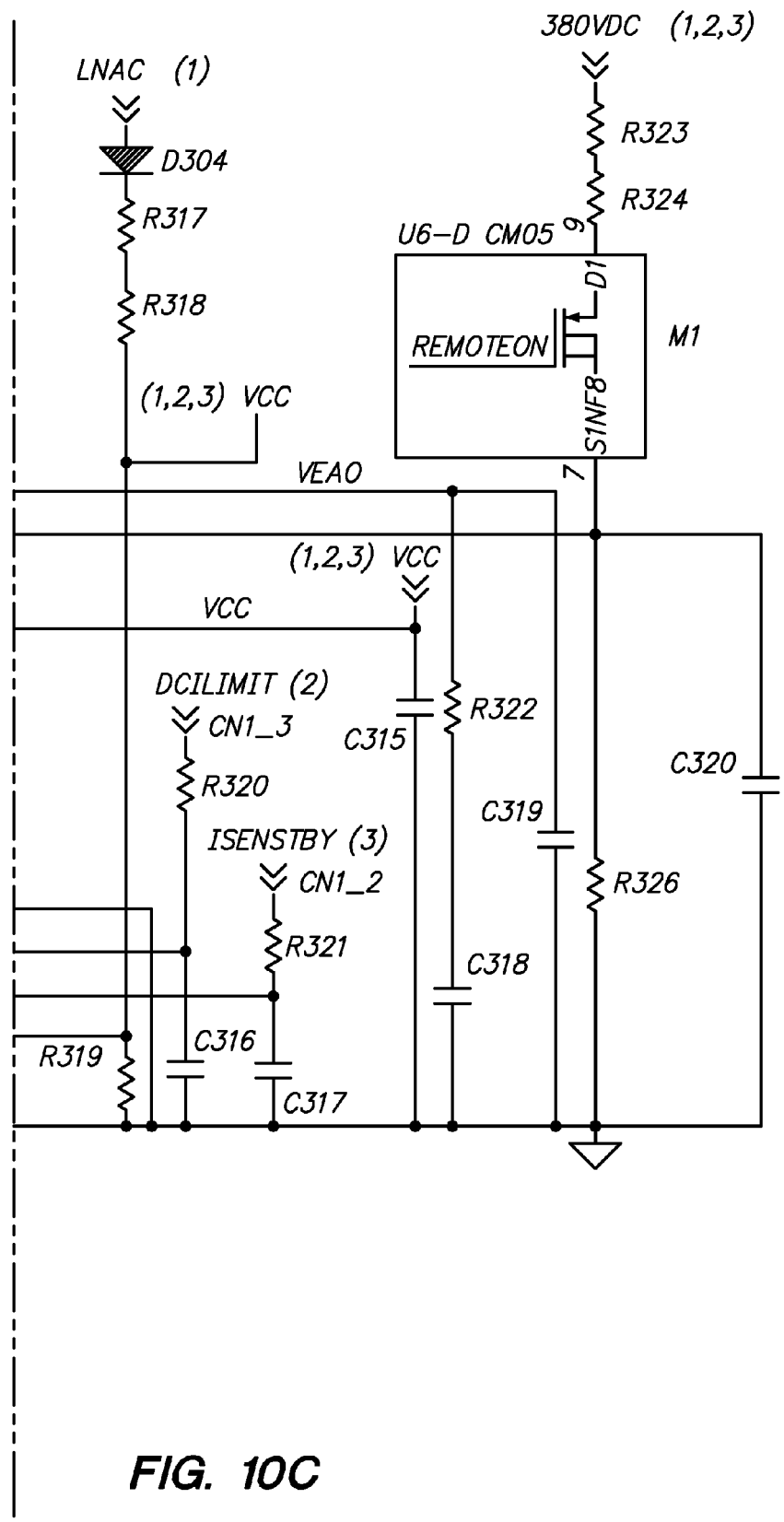
Figure 10D:
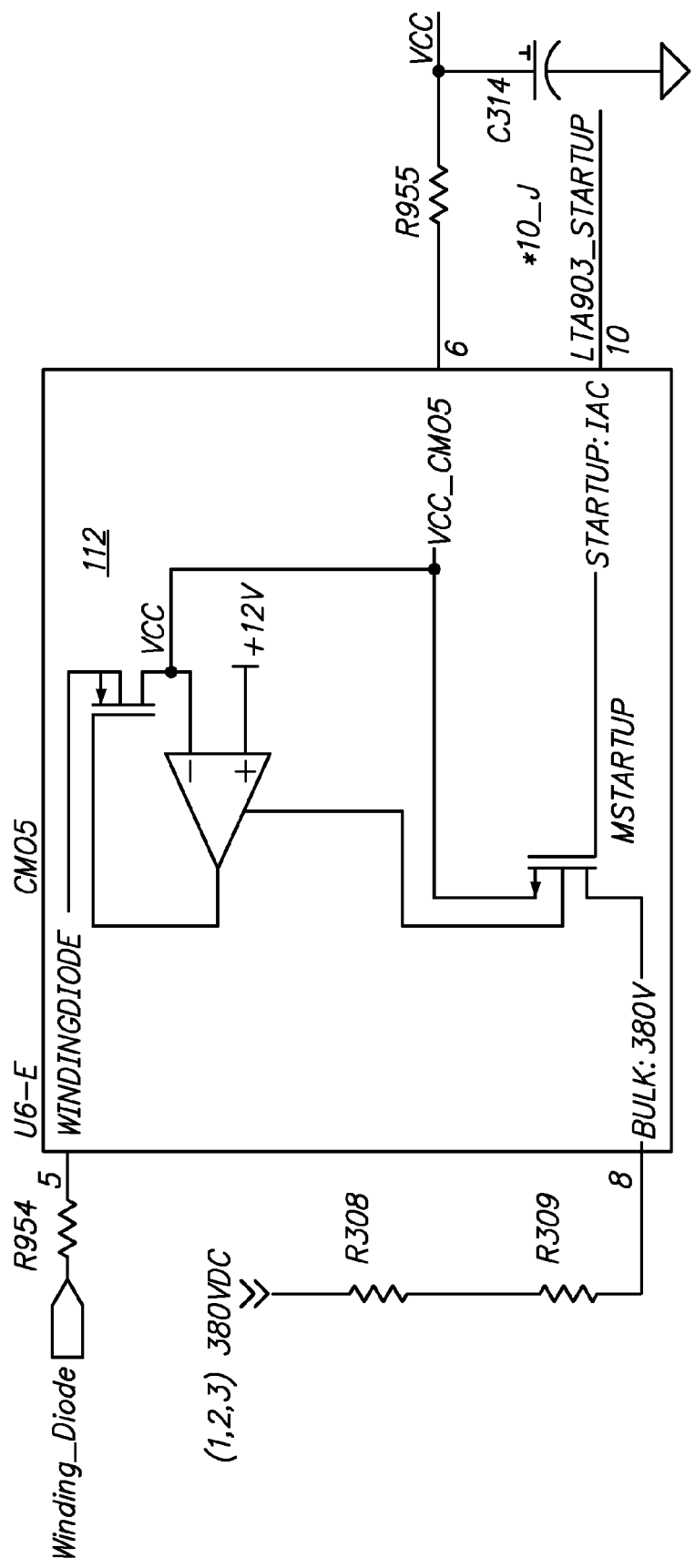
Figure 12A:
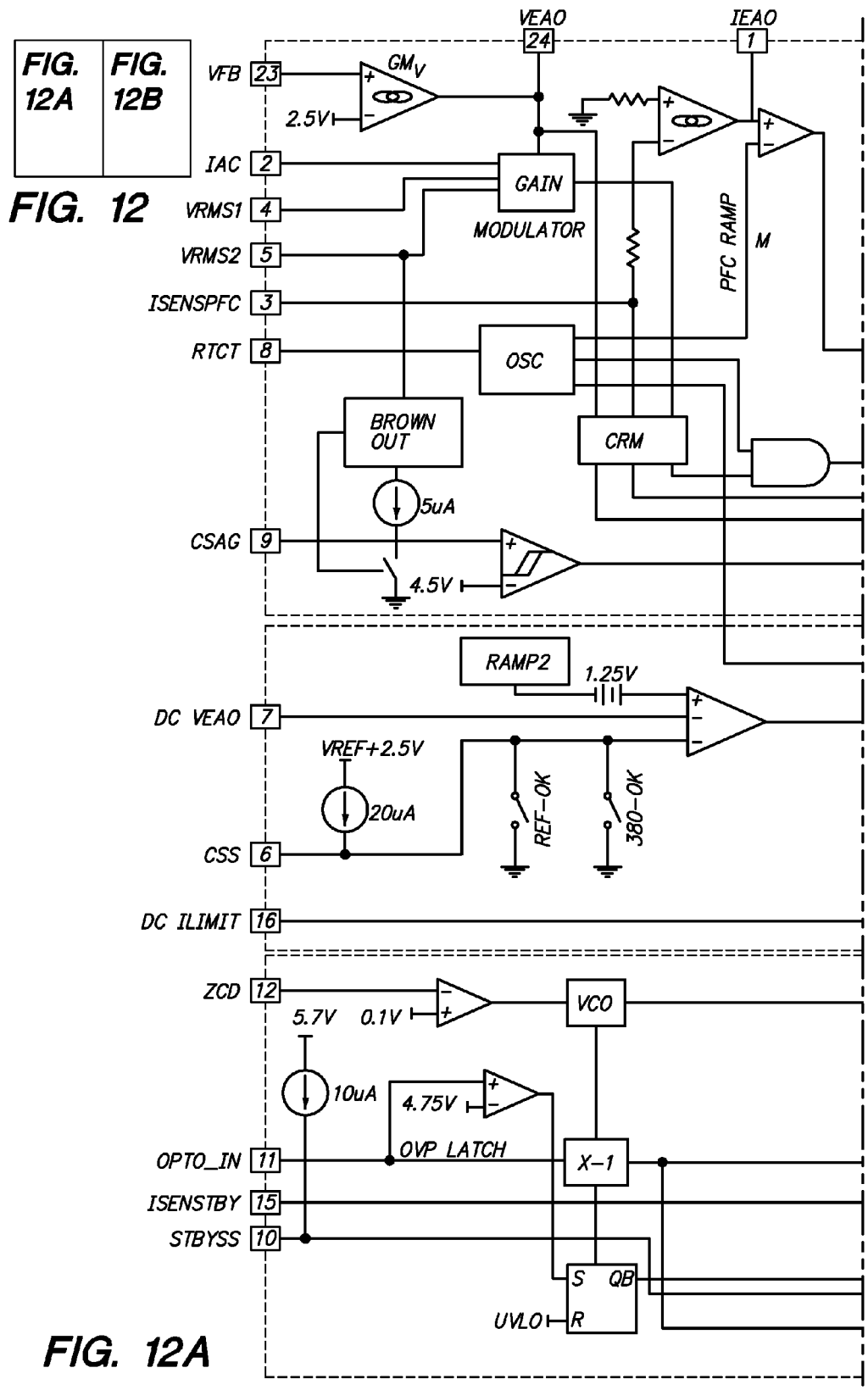
FIG. 12 illustrates a schematic diagram of a controller integrated circuit for the power supply of FIGS. 10 and 11 in accordance with an embodiment of the present invention.
Figure 12B:
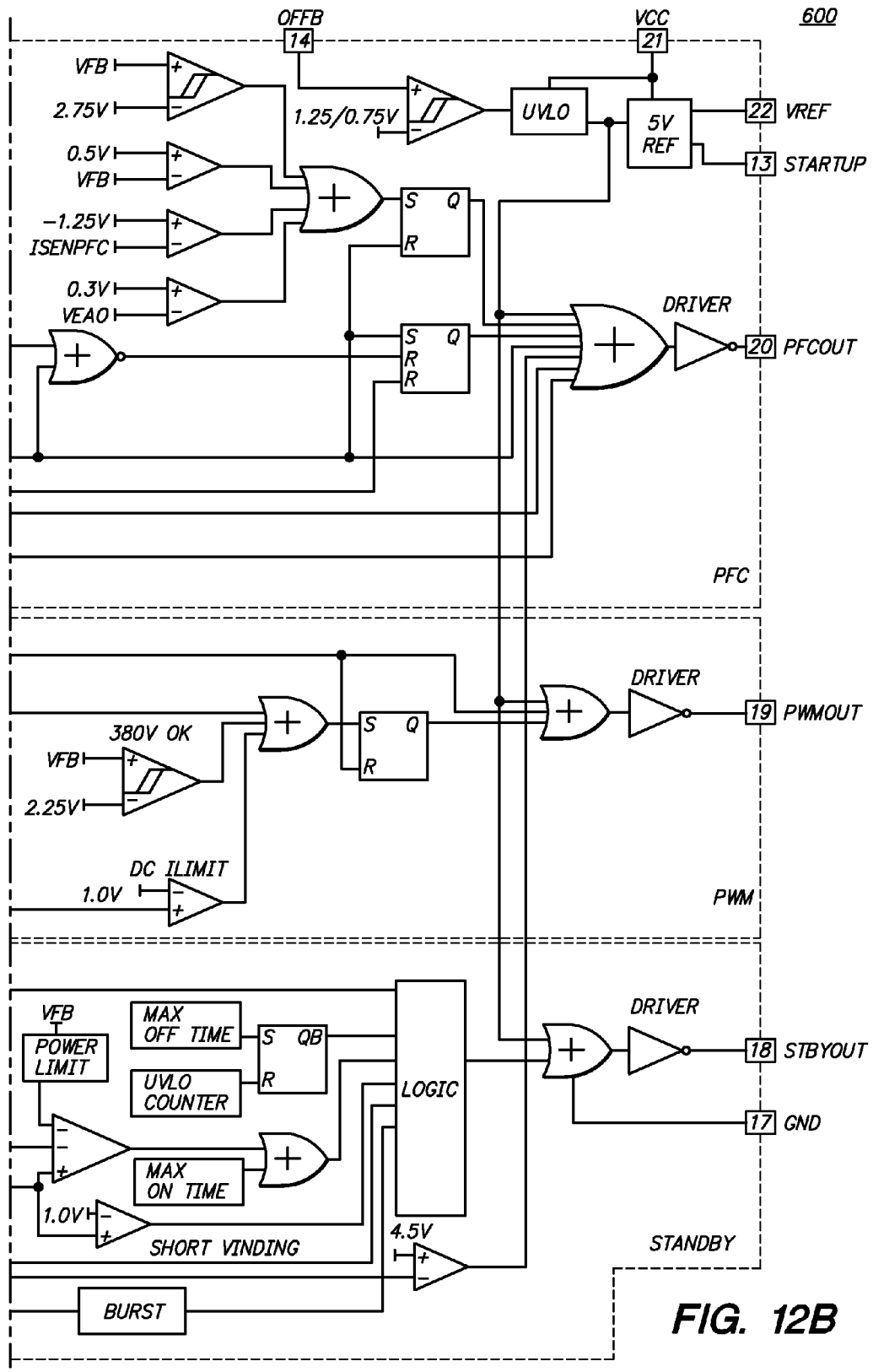

As shown in FIGS. 9-10, a remote on signal REMOTEON can control the transistor M2. As shown in FIG. 12, the CSS signal can be used to disable switching in the DC-to-DC converter 104. The transistor switch $M_2$ may not be subjected to high voltages. However, as before, the switch $M_2$ can be included in the integrated circuit 108 (FIG. 1), together with the switches $M_1$ and $M_3$.

While not shown in FIG. 7, the PFC stage 122 may include the discharge circuit 110 (FIG. 2) and the EMI circuit 112 (FIG. 2).

Figure 8:
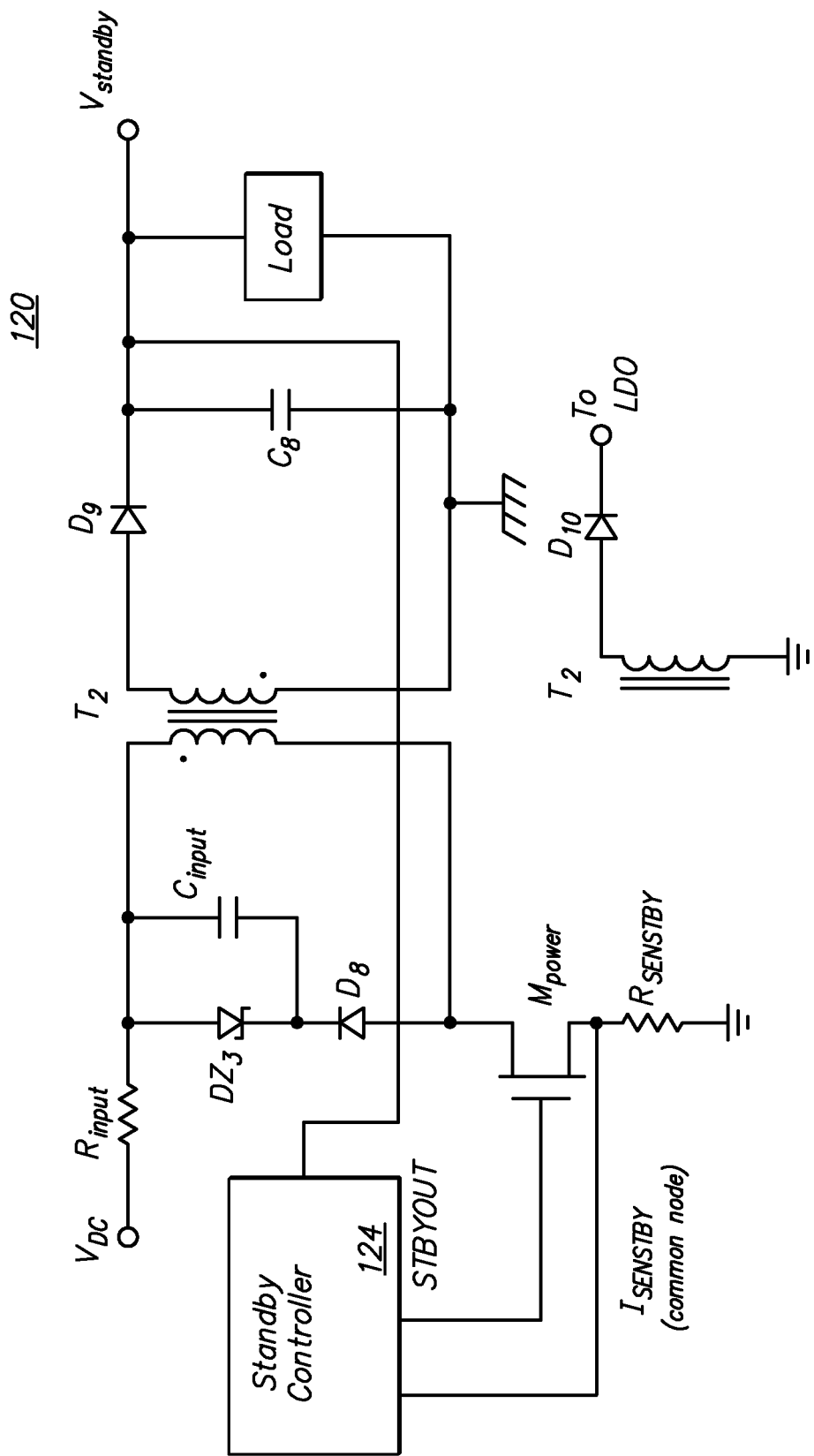
FIG. 8 illustrates a schematic diagram of a standby converter in accordance with an embodiment of the present invention.

FIG. 8 illustrates a schematic diagram of a standby converter 120 (FIG. 6) in accordance with an embodiment of the present invention. A power source, such as the output $V_{DC}$ generated by a PFC stage 102 or 122, is coupled to a first terminal of a resistor Rinput. A second terminal of the resistor Rinput is coupled to the anode of a Zener diode $DZ_3$ and to a first terminal of a capacitor Cinput and to a first terminal of a primary winding of a transformer $T_2$. The cathode of the Zener diode $DZ_3$ is coupled to a second terminal of the capacitor Cinput and to a cathode of a diode $D_8$. An anode of the diode $D_8$ is coupled to a second terminal of the primary winding of the transformer $T_2$ and to a first terminal of a transistor switch $M_{POWER}$. A second terminal of the transistor switch $M_{POWER}$ is coupled to a first terminal of a current sensing resistor $R_{SENSTBY}$. A second terminal of the resistor $R_{SENSTBY}$ is coupled to a ground node.

A first terminal of a secondary winding of the transformer $T_2$ is coupled to an anode of a diode $D_9$. A cathode of the diode $D_9$ is coupled to a first terminal of a capacitor $C_8$ and to output voltage node. A second terminal of the secondary winding of the transformer $T_2$ is coupled to a second terminal of the capacitor $C_8$ and to a ground node. The output voltage $V_{STANDBY}$ may be formed at the output voltage node. A load may be coupled to receive the output voltage $V_{STANDBY}$.

A standby converter controller 124 is coupled to the output voltage node and to receive a current sensing signal $I_{SENSTBY}$ from the current sensing resistor $R_{SENSTBY}$. The controller 124 monitors the output voltage $V_{STANDBY}$ and the current sensing signal $I_{SENSTBY}$ and controls operation of the transistor switch $M_{POWER}$ so as to maintain a constant level of the output voltage $V_{STANDBY}$. The controller 124 generates a STBYOUT signal which is coupled to a control terminal of the switch $M_{POWER}$. The switch $M_{POWER}$ receives high voltage levels and currents passing through the primary winding of the transformer $T_2$. As such, the switch $M_{POWER}$ is preferably manufactured using techniques that enable it to withstand these high voltage and current levels. In an embodiment, the transistor switch $M_{POWER}$ is included in the integrated circuit 108 (FIG. 1).

In a preferred embodiment, first terminal of the current sensing resistor $R_{SENSTBY}$ forms a common node for the integrated circuit 108. This common node serves as a ground level for the integrated circuit 108. As such, the body of the transistor switch $M_{POWER}$ is coupled to the common node. The body of each other MOSFET included in the integrated circuit 108 can also be coupled to the common node. The current sensing resistor $R_{SENSTBY}$ can be external to the integrated circuit 108 such that its second terminal is coupled to an external ground node. As such, the level of the common node fluctuates with respect to the external ground node. This can increase noise within the integrated circuit, however, this also tends to reduce Rds(on) for the $M_{POWER}$ transistor switch.

Alternatively, though less preferred, the integrated circuit 108 can be equipped with a ground pin which can be coupled to the ground node. In this case, the body of the MOSFET transistors can be coupled to the ground node.

The standby converter 104 of FIG. 8 is arranged as a flyback DC-to-DC converter type of topology. However, other converter types can be employed, such as a forward converter or some other type of converter.

As is also shown in FIG. 8, a first terminal of a second secondary winding of the transformer $T_2$ is coupled to an anode of a diode $D_{10}$. A second terminal of the second secondary winding of the transformer $T_2$ is coupled to a ground node. A cathode of the diode $D_{10}$ may be coupled to supply power to the LDO 116 (FIGS. 2 and 7).

Figure 11A:
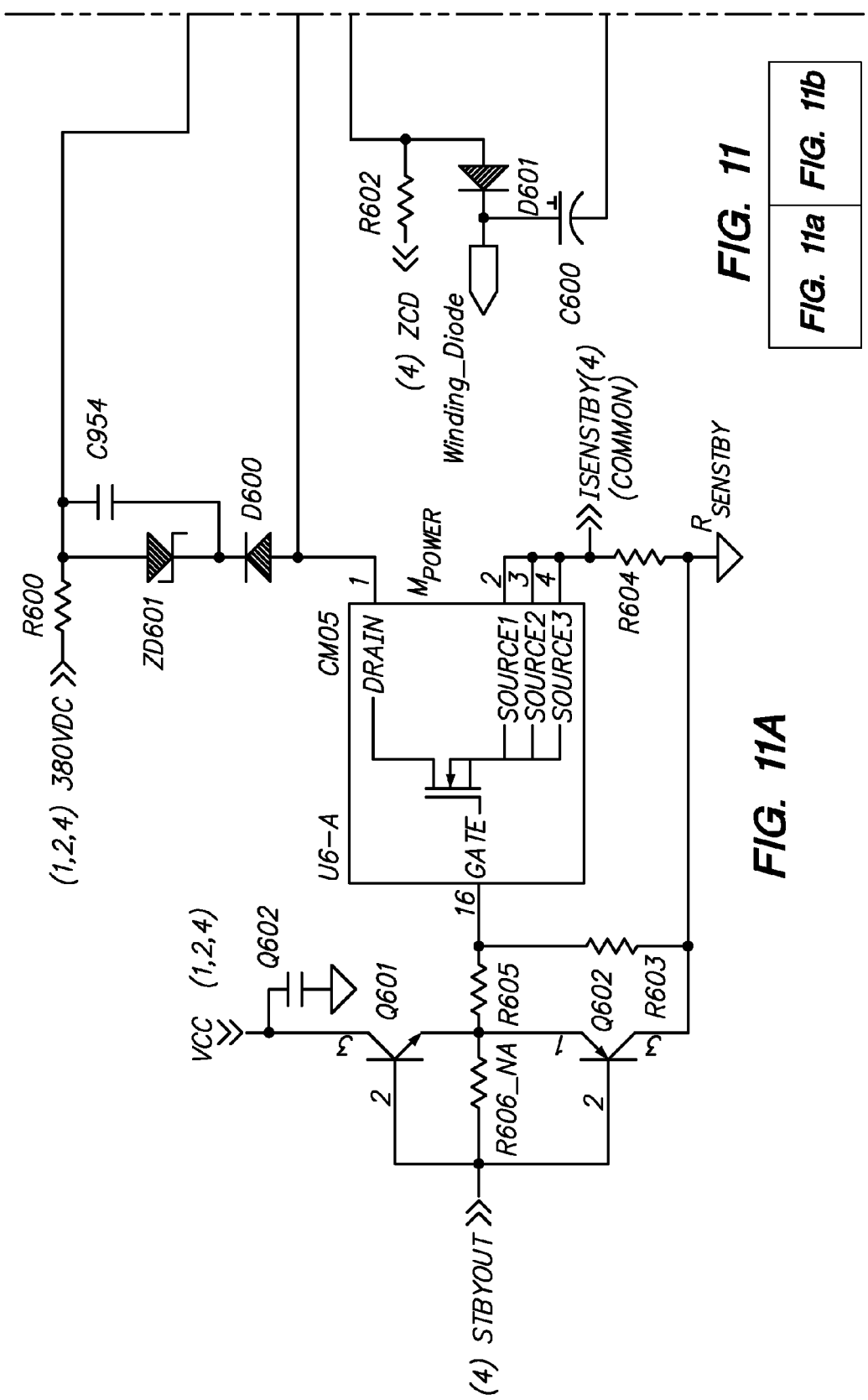
FIG. 11 illustrates a schematic diagram of a standby power converter for the power supply of FIG. 10 in accordance with an embodiment of the present invention.
Figure 11B:
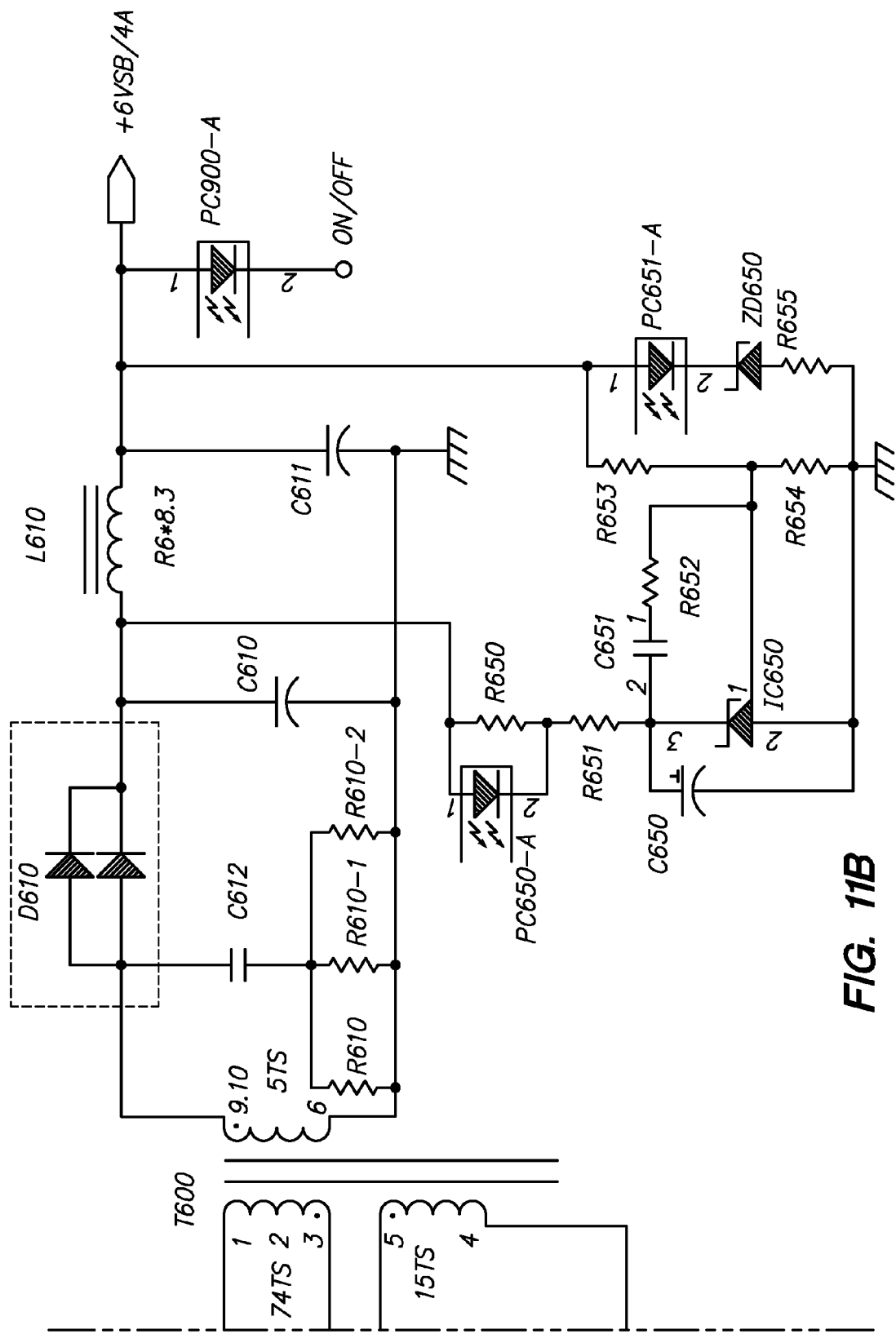

FIG. 9 illustrates a schematic diagram of the high power integrated circuit 108 (FIG. 1) in accordance with an embodiment of the present invention. As shown in FIG. 9, the integrated circuit 108 may include the transistors $M_1$, $M_2$, $M_3$, $M_{STARTUP}$ (FIG. 2) and the transistor $M_{POWER}$ (FIG. 8), as well as the LDO 112 (FIG. 2). FIG. 10 illustrates a schematic diagram of a power supply in accordance with an embodiment of the present invention. FIG. 11 illustrates a schematic diagram of a DC-to-DC converter for the power supply of FIG. 10 in accordance with an embodiment of the present invention. The power supply of FIGS. 10 and 11 may employ the integrated circuit 108 of FIG. 9. FIGS. 10 and 11 show locations of the transistors $M_{POWER}$, $M_1$, $M_2$, $M_3$, $M_{STARTUP}$ as well as the LDO 112 of the integrated circuit 108. Additionally, the power supply of FIGS. 10 and 11 may be controlled by a controller integrated circuit 600. FIG. 12 illustrates a schematic diagram of a controller integrated circuit 600 for the power supply of FIGS. 10 and 11 in accordance with an embodiment of the present invention.

While the integrated circuit 108 is shown in FIG. 9 as including the transistors $M_1$, $M_2$, $M_3$, $M_{STARTUP}$ (FIG. 2) and the transistor $M_{POWER}$ (FIG. 8), as well as the LDO 112 (FIG. 2), this is not necessary. In other embodiments more or fewer components may be included in the integrated circuit. For example, the transistor $M_4$ of FIG. 3 may be included in integrated circuit 108. As another example, elements of the discharge circuit of FIG. 4 may be included in the integrated circuit of FIG. 4. As still another example, the driver 114 of FIG. 5 may be included in the integrated circuit 108.

Figure 13:
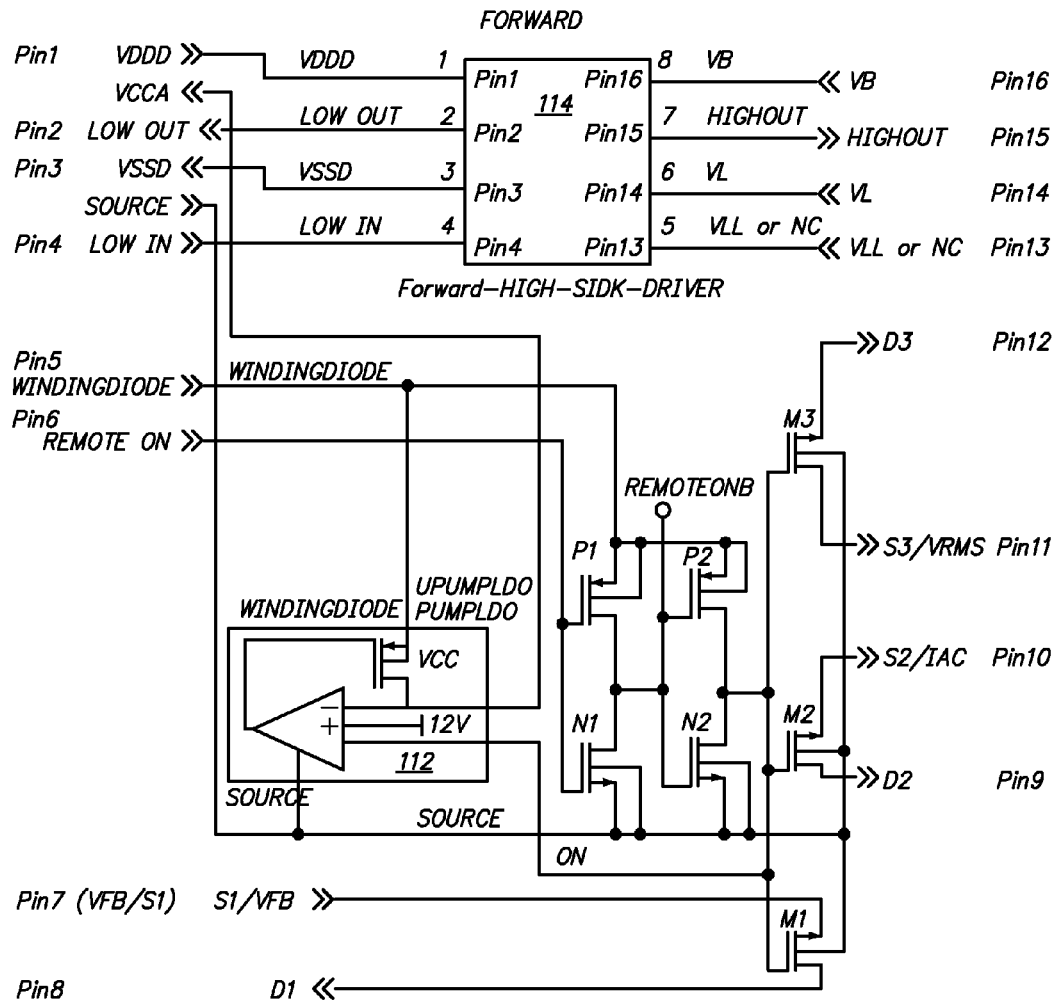
FIG. 13 illustrates a schematic diagram of a high power integrated circuit in accordance with an embodiment of the present invention.

FIG. 13 illustrates a schematic diagram of a high power integrated circuit 108' in accordance with an alternative embodiment of the present invention. As shown in FIG. 13, the integrated circuit 108' may include the transistors $M_1$, $M_2$, $M_3$ (FIG. 2) as well as the driver 114 (FIG. 5) and LDO 112 (FIG. 2).

Figure 14:
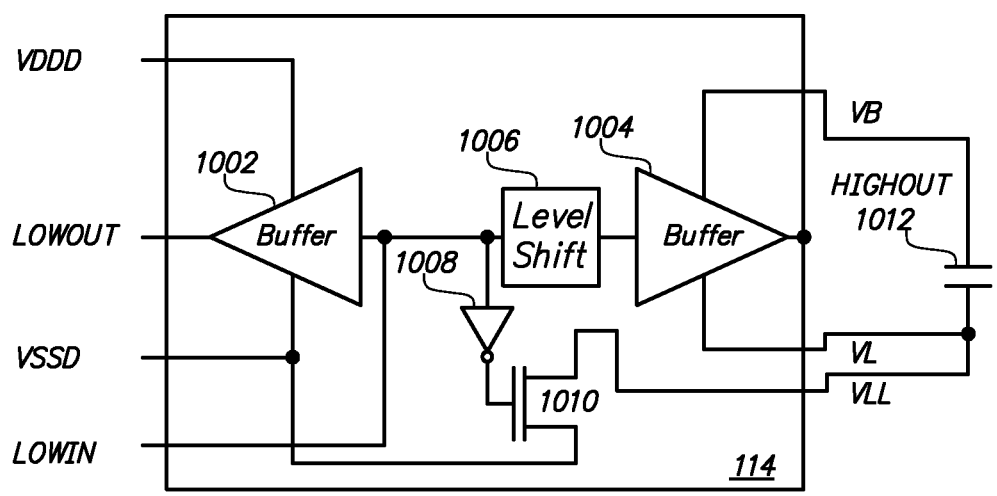
FIG. 14 illustrates a schematic diagram of a driver for the integrated circuit of FIG. 13 in accordance with an embodiment of the present invention.

FIG. 14 illustrates a schematic diagram of the driver (114) for the integrated circuit 108' of FIG. 13 in accordance with an embodiment of the present invention. As shown in FIG. 14, the driver 114 includes a pair of buffers 1002, 1004 that are coupled to receive a control signal LOWIN. The signal LOWIN may be derived from the signal PWMOUT (also shown in FIG. 5). The buffer 1002 forms the control signal LOWOUT (also shown in FIG. 5), while the buffer 1004 forms the control signal HIGHOUT (also shown in FIG. 5). A level shift 1006 shifts the level of the signal LOWIN to a level suitable for the buffer 1004. The buffer 1002 receives power through connections to pins labeled VDDD and VSSD, while the buffer 1004 receives power through connections to pins labeled VB and VL. The control signal LOWIN is also inverted by an inverter 1008, which is then used to control transistor 1010. When the control signal LOWIN turns the switch QC off, the transistor 1010 pulls down the VL pin which charges a capacitor 1012. The capacitor 1012 supplies power for the buffer 1004.

Figures 15, 15A:
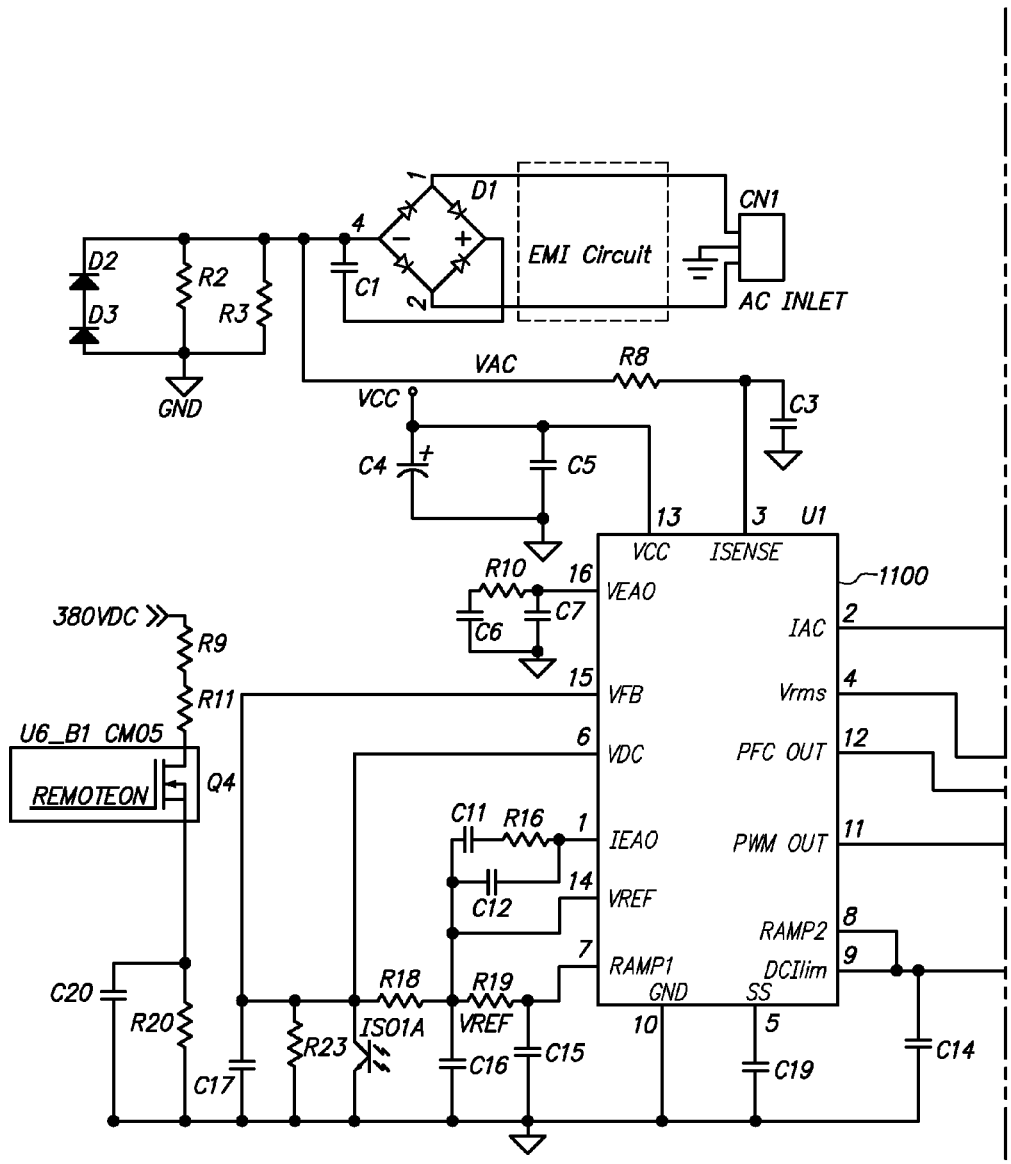
FIG. 15 illustrates a schematic diagram of a power supply in accordance with an embodiment of the present invention.
Figure 15B:
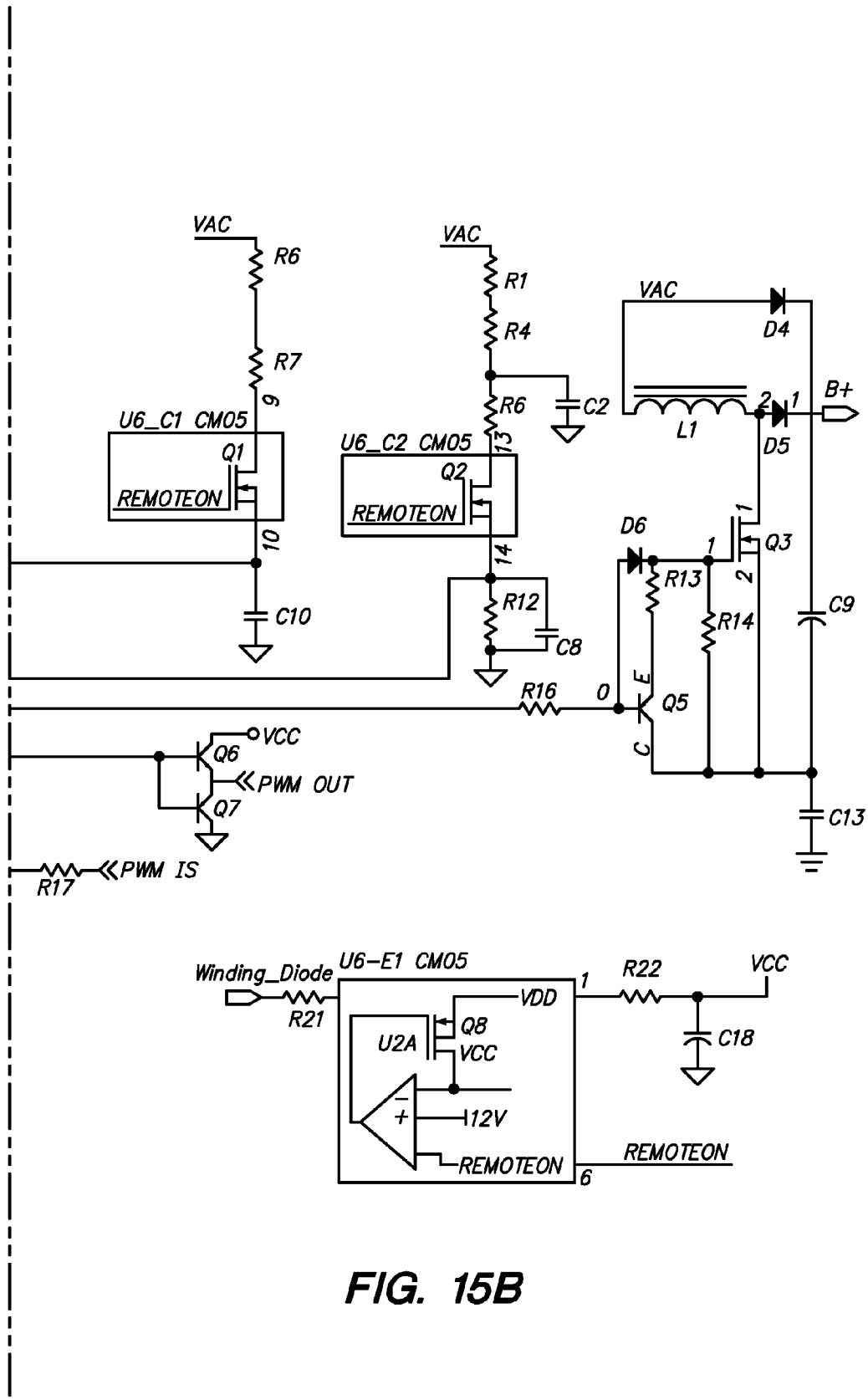
Figure 16:
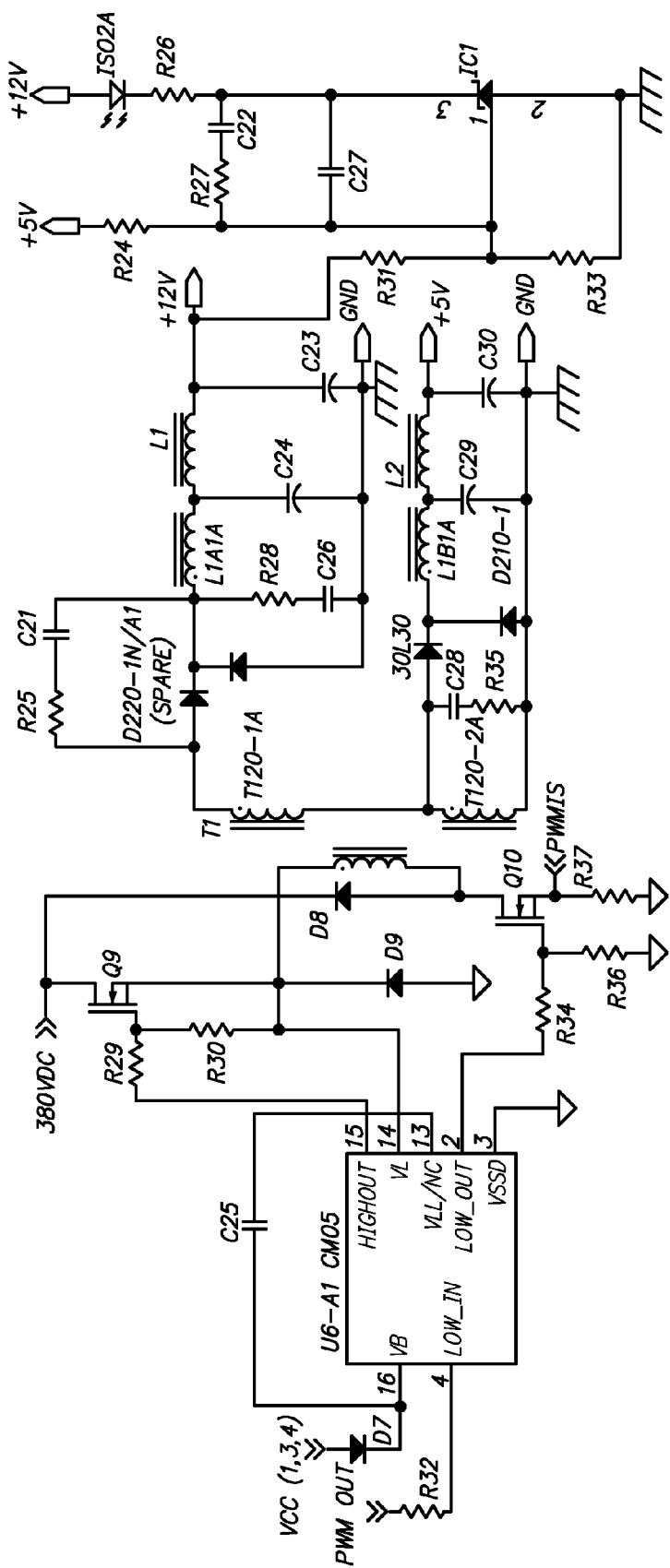
FIG. 16 illustrates a schematic diagram of a DC-to-DC converter for the power supply of FIG. 15 in accordance with an embodiment of the present invention.
Figure 17A:
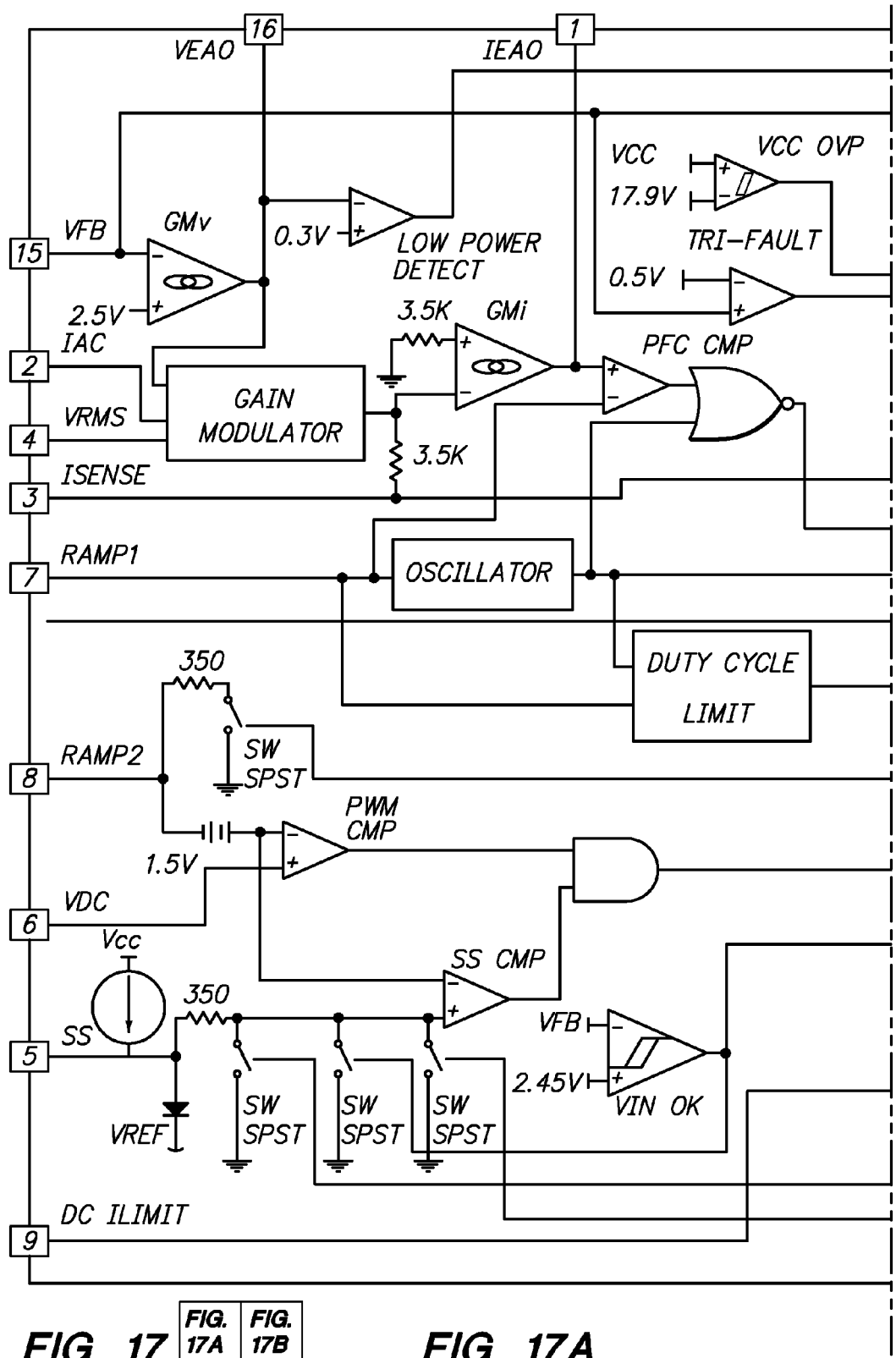
FIG. 17 illustrates a schematic diagram of a controller integrated circuit for the power supply of FIGS. 15 and 16 in accordance with an embodiment of the present invention.
Figure 17B:
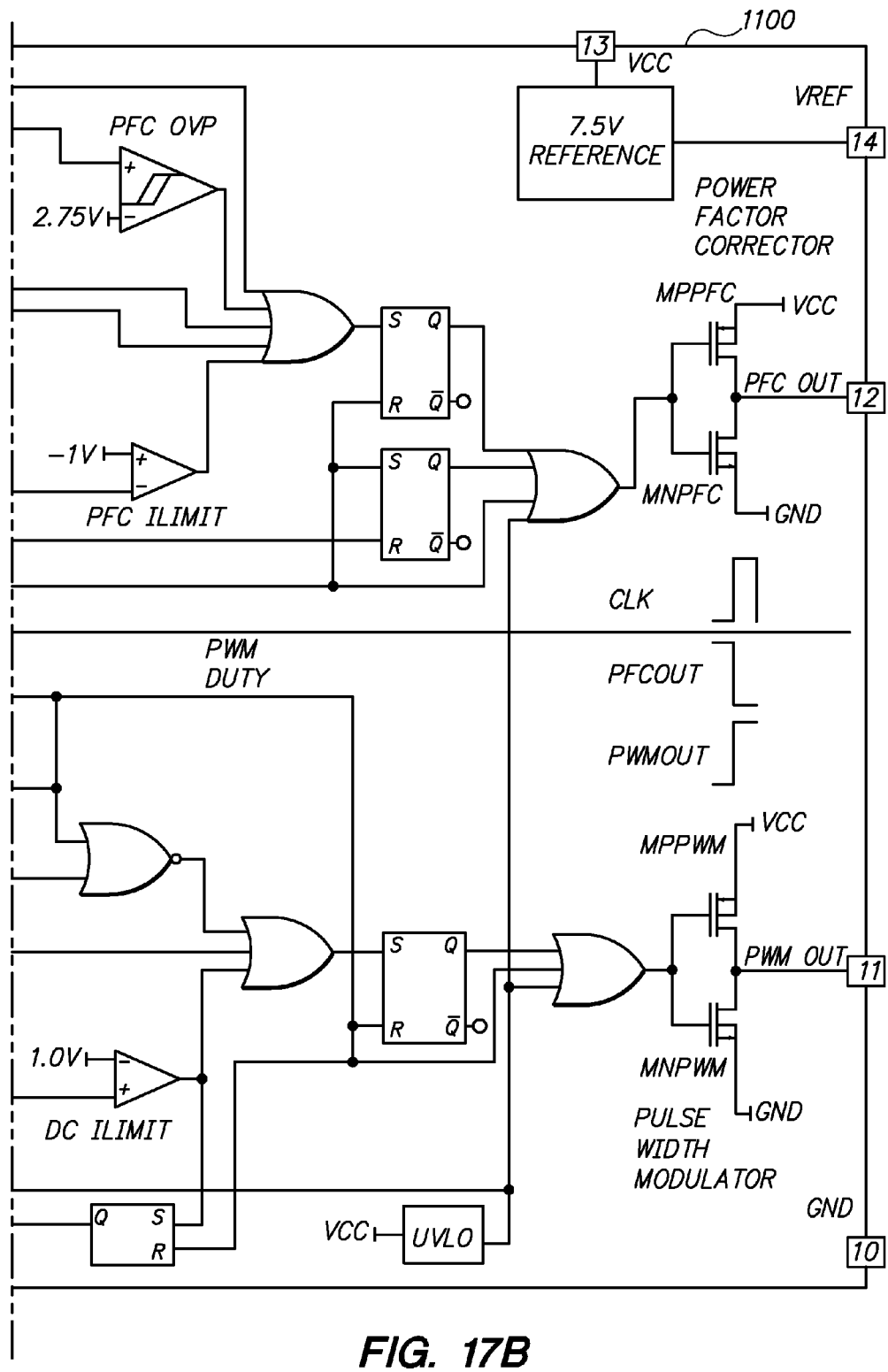

FIG. 15 illustrates a schematic diagram of a power supply in accordance with an embodiment of the present invention. FIG. 16 illustrates a schematic diagram of a DC-to-DC converter for the power supply of FIG. 15 in accordance with an embodiment of the present invention. FIGS. 15 and 16 show locations of the transistors $M_1$, $M_2$, $M_3$, as well as the driver 114 and LDO 112 of the integrated circuit 108'. Additionally, the power supply of FIGS. 15 and 16 may be controlled by a controller integrated circuit 1100. FIG. 17 illustrates a schematic diagram of a controller integrated circuit 1100 for the power supply of FIGS. 15 and 16 in accordance with an embodiment of the present invention. The controller integrated circuit 1100 may be obtained under part number CM6800 through Champion Microelectronic Corporation, whose address is 5F, No. 11, Park Ave. II, Hsinchu Science-Based Industrial Park, Hsinchu City, Taiwan.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A switching power supply comprising:
   a controller configured to control one or more power supply stages that receive power from an input power source and that generate a regulated output voltage for powering a load wherein the controller is configured to monitor at least the regulated output voltage and to generate at least one switch control signal for alternately opening and closing a switch so as to regulate the regulated output voltage; and
   a monolithic integrated circuit separate from the controller and coupled to receive the switch control signal from the controller wherein the monolithic integrated circuit comprises a plurality of transistors capable of operation at voltage levels that are at least one order of magnitude higher than voltage levels within the controller.

2. The switching power supply according to claim 1, a controller integrated circuit comprises the controller.

3. The switching power supply according to claim 1, wherein the one or more power supply stages comprise a DC-to-DC converter stage.

4. The switching power supply according to claim 3, wherein the at least one switch control signal includes at least one modulation control signal for regulating an output voltage of a DC-to-DC converter stage of the power supply and wherein the plurality of transistors of the monolithic integrated circuit includes at least one transistor coupled to receive the at least one modulation control signal.

5. The switching power supply according to claim 4, wherein the DC-to-DC converter stage of the power supply includes a sensing resistor wherein a first terminal of the sensing resistor forms a common node for the monolithic integrated circuit and a second terminal of the sensing resistor is coupled to an external ground node.

6. The switching power supply according to claim 5, wherein a body of the transistor coupled to receive the modulation control signal is connected to the common node.

7. The switching power supply according to claim 4, wherein the DC-to-DC converter stage comprises a flyback converter and wherein the at least one transistor coupled to receive the at least one pulse width modulation control signal comprises a power MOSFET for switching an input current in the DC-to-DC converter stage.

8. The switching power supply according to claim 7, wherein the one or more power supply stages comprise a main DC-to-DC converter stage and wherein the flyback converter provides standby power when the main DC-to-DC converter stage is inactive.

9. The switching power supply according to claim 4, wherein the DC-to-DC converter stage comprises a forward converter and wherein the at least one transistor coupled to receive at least one modulation control signal comprises a high-side driver for switching an input current in the DC-to-DC converter stage.

10. The switching power supply according to claim 1, wherein the one or more power supply stages comprise a power factor correction stage.

11. The switching power supply according to claim 10, wherein the monolithic integrated circuit further comprises a first plurality of transistor switches for receiving an input voltage sensing signal and an output voltage sensing signal from the power factor correction stage, wherein the first plurality of transistor switches are configured to selectively disable the input voltage sensing signal and the output voltage sensing signal when the power factor correction stage is inactive.

12. The switching power supply according to claim 11, wherein the controller further monitors the input voltage sensing signal and an output voltage sensing signal from the power factor correction stage for generating a switch control signal for the power factor correction stage.

13. The switching power supply according to claim 10, wherein the controller senses an input current signal using a sensing resistance and wherein the sensing resistance is adjustable by controlling one or more transistor switches.

14. The switching power supply according to claim 13, wherein the monolithic integrated circuit further comprises the one or more transistor switches that control the sensing resistance.

15. The switching power supply according to claim 13, wherein the sensing resistance is adjusted in response to load conditions.

16. The switching power supply according to claim 1, wherein the monolithic integrated circuit further comprises a low drop out regulator for regulating a supply voltage for powering the controller.

17. The switching power supply according to claim 16, wherein the low drop out regulator comprises at least a transistor.

18. The switching power supply according to claim 1, wherein the monolithic integrated circuit further comprises a start-up transistor for temporarily providing a supply voltage for powering the controller upon start-up of the switching power supply.

19. The switching power supply according to claim 1, wherein the monolithic integrated circuit further comprises one or more discharge transistors for discharging capacitance at input terminals to the one or more power supply stages when the one or more power supply stages are disconnected from an input power source.

20. A monolithic integrated circuit apparatus for a switching power supply comprising:
a first plurality of transistor switches for receiving an input voltage sensing signal and an output voltage sensing signal from a power factor correction stage of the switching power supply, wherein the first plurality of transistor switches are configured to selectively disable the input voltage sensing signal and the output voltage sensing signal when the power factor correction stage is inactive; and
at least one transistor coupled to receive at least one switch control signal for regulating an output voltage of a DC-to-DC converter stage of the power supply.

21. The apparatus according to claim 20, wherein the DC-to-DC converter stage comprises a flyback converter and wherein the at least one transistor coupled to receive at least one switch control signal comprises a power MOSFET for switching an input current in the DC-to-DC converter stage.

22. The apparatus according to claim 20, wherein the DC-to-DC converter stage comprises a forward converter and wherein the at least one transistor coupled to receive at least one switch control signal comprises a high-side driver for switching an input current in the DC-to-DC converter stage.

23. The apparatus according to claim 20, further comprising a low drop out regulator for regulating a supply voltage for powering control circuitry wherein the control circuitry monitors the output voltage of a DC-to-DC converter stage of the power supply and generates the switch control signal.

24. The apparatus according to claim 23, wherein the low drop out regulator comprises at least a transistor.

25. The apparatus according to claim 23, wherein the control circuitry further monitors the input current sensing signal, the input voltage sensing signal and an output voltage sensing signal from the power factor correction stage and generates a switch control signal for the power factor correction stage.

26. The apparatus according to claim 20, further comprising start-up transistor for temporarily providing a supply voltage for powering control circuitry upon start-up of the switching power supply.

27. The apparatus according to claim 20, further comprising one or more discharge transistors for discharging capacitance at input terminals to the power factor correction stage when the power factor correction stage is disconnected from a power source.

28. The switching power supply according to claim 20, wherein a controller for the power factor correction stage senses an input current signal using a sensing resistance and wherein the sensing resistance is adjustable by controlling one or more transistor switches.

29. The switching power supply according to claim 28, wherein the monolithic integrated circuit further comprises the one or more transistor switches that control the sensing resistance.

30. The switching power supply according to claim 28, wherein the sensing resistance is adjusted in response to load conditions.

31. The apparatus according to claim 20, wherein the transistors of the monolithic integrated circuit are capable of operation at voltage levels that are at least one order of magnitude higher than the switch control signal.

* * * * *